(12) United States Patent
Luo et al.

(10) Patent No.: US 7,454,040 B2
(45) Date of Patent: Nov. 18, 2008

(54) SYSTEMS AND METHODS OF DETECTING AND CORRECTING REDEYE IN AN IMAGE SUITABLE FOR EMBEDDED APPLICATIONS

(75) Inventors: Huitao Luo, Sunnyvale, CA (US); Jonathan Yen, San Jose, CA (US); Daniel Tretter, San Jose, CA (US); Niaz R. Pavel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 10/653,021

(22) Filed: Aug. 29, 2003

(65) Prior Publication Data

US 2005/0047656 A1   Mar. 3, 2005

(51) Int. Cl.
*G06K 9/00* (2006.01)
(52) U.S. Cl. ...................................... 382/117; 382/274
(58) Field of Classification Search ................. 382/117, 382/167, 165, 275, 164, 103, 274, 118, 199, 382/173, 162, 190, 115; 348/239, 241; 396/191, 396/198; 426/72, 311, 620, 640, 641, 658
See application file for complete search history.

(56) References Cited

U.S. PATENT DOCUMENTS

| 5,432,863 | A | | 7/1995 | Benati et al. |
| 6,009,209 | A | | 12/1999 | Acker et al. |
| 6,016,354 | A | | 1/2000 | Lin et al. |
| 6,292,574 | B1 | * | 9/2001 | Schildkraut et al. ......... 382/117 |
| 2002/0150292 | A1 | * | 10/2002 | O'Callaghan ................ 382/167 |
| 2002/0176623 | A1 | | 11/2002 | Steinberg |
| 2003/0044063 | A1 | * | 3/2003 | Meckes et al. ............... 382/165 |
| 2004/0037460 | A1 | * | 2/2004 | Luo et al. .................... 382/165 |
| 2004/0196503 | A1 | * | 10/2004 | Kurtenbach et al. ......... 358/1.18 |

FOREIGN PATENT DOCUMENTS

EP  0635972  1/1995

OTHER PUBLICATIONS

Hardeberg, J. Y.—"Digital Red Eye Removal"—Journal of Imaging Science and Technology—vol. 46 No. 4 Jul. 2002—pp. 375-379.
Viola, P. et al—"Rapid Objecy Detection Using a Boosted Cascade of Simple Features"—Proc of the IEEE Conf on Computer Vision and Pattern Recognition—vol. 1—Dec. 8, 2002.

(Continued)

*Primary Examiner*—Sheela C Chawan

(57) ABSTRACT

Systems and methods of detecting and correcting redeye in an image are described. In one aspect, the input image is subsampled to generate a thumbnail image, redeye pixel areas are detected in the thumbnail image. In another aspect, an input image having lines of pixels with original color values is processed. One or more redeye pixel areas corresponding to respective areas in the input image are detected. Each pixel in the input image corresponding to the detected redeye pixel areas is classified as a redeye pixel or a non-redeye pixel on a line-by-line basis without reference to pixels in adjacent lines. The original color values of pixels in the input image classified as redeye pixels are corrected.

64 Claims, 13 Drawing Sheets

OTHER PUBLICATIONS

Smolka, B. et al—"Towards Automatic Redeye Effect Removal"—Pattern Recognition Letters—vol. 24 No. 11 Jul. 2003—pp. 1767-1785.

Patti, A. et al—"Automatic Digital Redeye Reduction"—Proc of the Int'l Conf on Image Processing—vol. 3—Oct. 4, 1998—pp. 55-59.

Gaubatz, M. et al—"Automatic Red-Eye Detection and Correction"—Proc Int'l Conf in Image Processing—vol. 2 Sep. 22, 2002—pp. 804-807.

M. Gaubatz and R. Ulichney, "Automatic red-eye detection and correction," ICIP, New York, 2002.

R-L Hsu, M. Abdel-Mottaleb and A.K. Jain, "Face Detection in Color Images," ICIP, Thessaloniki, 2001.

"Better Pictures, More Choices," Eastman Kodak Company, (Feb. 5, 2002).

"Industry's first completely automatic red eye detection and reduction system launched," Pictos Technologies, Inc. (Apr. 2002).

"Red-Eye Removal," Pixology—Product Categories, (before Apr. 2003).

Paul Viola and Michael J. Jones, "Robust Real-Time Object Detection," Cambridge Research Reports Technical Report Series (Feb. 2001).

Chrisophe Garcia & Georgios Tziritas, "Face Detection Using Quantized Skin Color Regions Merging and Wavelet Packet Analysis," IEEE Transactions on Multimedia, vol. 1, No. 3 Sep. 1999).

Bob Fisher et al., "HyperMedia Image Processing Reference," Department of Art. Intell., Univ. of Edinburgh, UK, 6 pp (1994) (http://www.cee.hw.ac.uk/hipr/html/hipr_top.html).

* cited by examiner

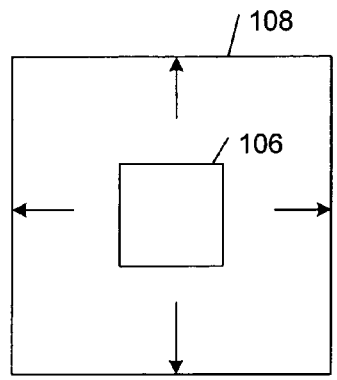
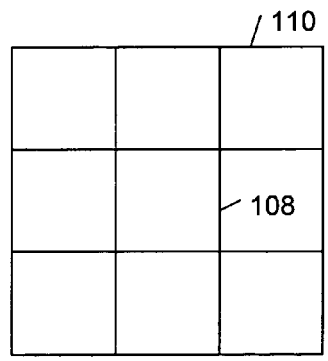
FIG. 12A                    FIG. 12B
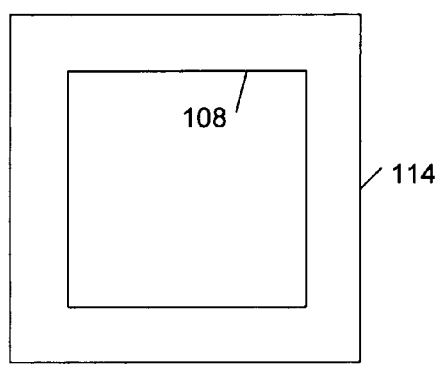
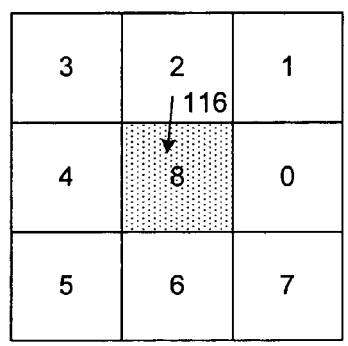
FIG. 13A                    FIG. 13B
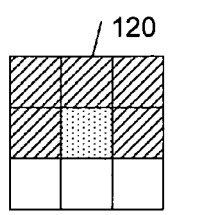 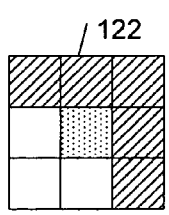 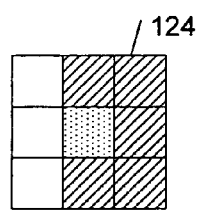 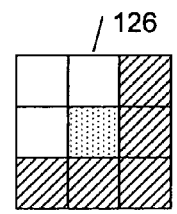
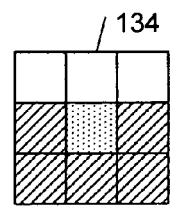 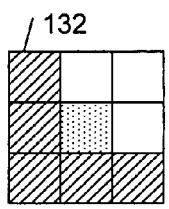 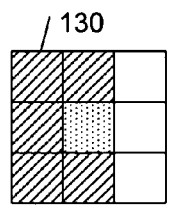 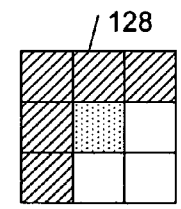
FIG. 14

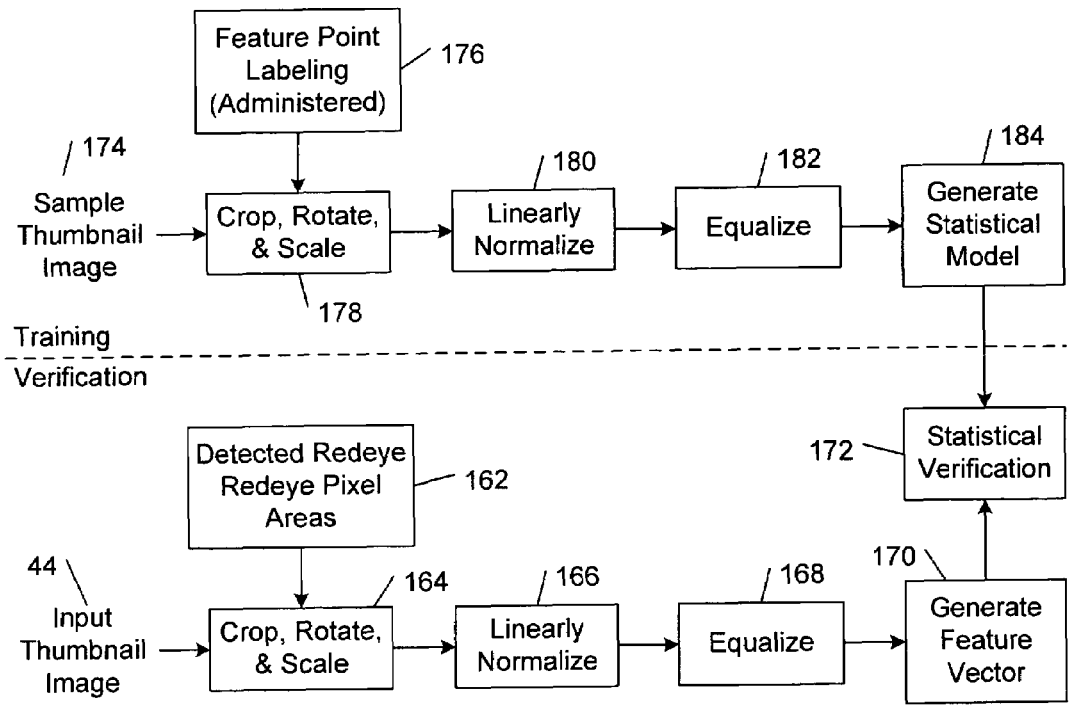
FIG. 19
FIG. 20

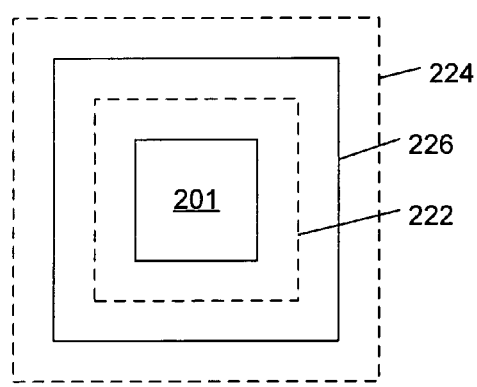
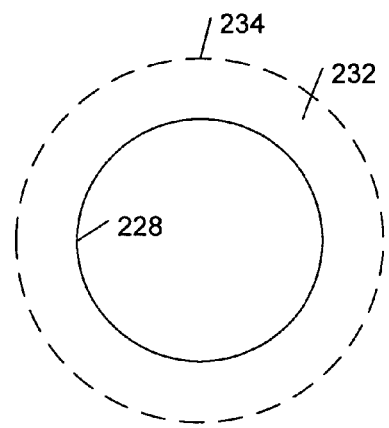
FIG. 25A  FIG. 25B
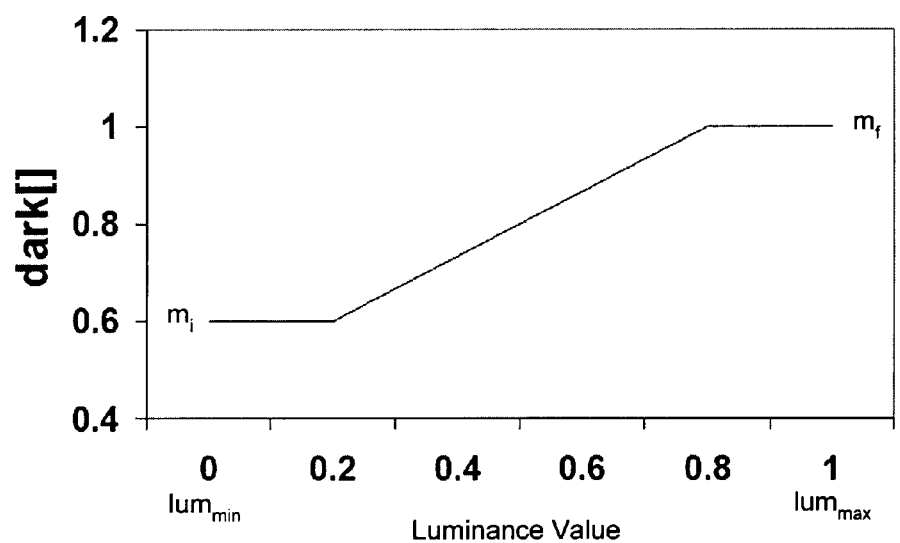
FIG. 26

SYSTEMS AND METHODS OF DETECTING AND CORRECTING REDEYE IN AN IMAGE SUITABLE FOR EMBEDDED APPLICATIONS

CROSS-REFERENCE TO RELATED APPLICATIONS

This application relates to the following applications, each of which is incorporated herein by reference: U.S. patent application Ser. No. 10/424,419, filed Apr. 28, 2003, by Huitao Luo et al., and entitled "DETECTING AND CORRECTING RED-EYE IN A DIGITAL IMAGE;" and U.S. patent application Ser. No. 10/653,019, filed on even date herewith by Huitao Luo et al., and entitled "DETECTING AND CORRECTING RED-EYE IN AN IMAGE".

TECHNICAL FIELD

This invention relates to systems and methods of detecting and correcting redeye in an image.

BACKGROUND

Redeye is the appearance of an unnatural reddish coloration of the pupils of a person appearing in an image captured by a camera with flash illumination. Redeye is caused by light from the flash reflecting off blood vessels in the person's retina and returning to the camera.

Several techniques have been proposed to reduce the redeye effect. A common redeye reduction solution for cameras with a small lens-to-flash distance is to use one or more pre-exposure flashes before a final flash is used to expose and capture an image. Each pre-exposure flash tends to reduce the size of a person's pupils and, therefore, reduce the likelihood that light from the final flash will reflect from the person's retina and be captured by the camera. In general, pre-exposure flash techniques typically only will reduce, but not eliminate, redeye.

A large number of image processing techniques have been proposed to detect and correct redeye in color images. In general, these techniques typically are semi-automatic or automatic. Semi-automatic redeye detection techniques rely on human input. For example, in some semi-automatic redeye reduction systems, a user must manually identify to the system the areas of an image containing redeye before the defects can be corrected. Many automatic redeye reduction systems rely on a preliminary face detection step before redeye areas are detected. A common automatic approach involves detecting faces in an image and, subsequently, detecting eyes within each detected face. After the eyes are located, redeye is identified based on shape, coloration, and brightness of image areas corresponding to the detected eye locations. In general, face-detection-based automatic redeye reduction techniques have high computation and memory resource requirements. In addition, most of the face detection algorithms are only able to detect faces that are oriented in an upright frontal view; these approaches cannot detect faces that are rotated in-plane or out-of-plane with respect to the image plane.

Embedded systems are processing systems that often are incorporated into a larger system, such as a device, an appliance, or a tool. An embedded system usually includes computer hardware, software, or firmware that provides limited processing power and usually has access to limited memory resources. A computer printer typically includes an embedded system that provides a basic user interface that allows a user to manually push buttons, and to start and stop printing, and to otherwise control the printer and examine its status.

Any solution for implementing functionality in an embedded application environment must operate within the limited processing power constraints and the limited memory resource constraints of the embedded system. As a result, implementing functionality, such a detecting and correcting redeye in an image is a challenge in an embedded application environment.

SUMMARY

The invention features systems and methods of detecting and correcting redeye in an image.

In one aspect, the invention features a scheme (systems and methods) for processing an input image. In accordance with this inventive scheme, the input image is sub-sampled to generate a thumbnail image, redeye pixel areas are detected in the thumbnail image.

In another aspect, the invention features a scheme (systems and methods) for processing an input image having lines of pixels with original color values. In accordance with this inventive scheme, one or more redeye pixel areas corresponding to respective areas in the input image are detected. Each pixel in the input image corresponding to the detected redeye pixel areas is classified as a redeye pixel or a non-redeye pixel on a line-by-line basis without reference to pixels in adjacent lines. The original color values of pixels in the input image classified as redeye pixels are corrected.

Other features and advantages of the invention will become apparent from the following description, including the drawings and the claims.

DESCRIPTION OF DRAWINGS

FIG. 12A is a diagrammatic view of a candidate redeye pixel area being enlarged.

FIG. 12B is a diagrammatic view of the enlarged candidate redeye pixel area of FIG. 12A surrounded by a set of eight neighboring pixel areas.

FIG. 13A is diagrammatic view of a candidate redeye pixel area surrounded by a candidate grayscale iris pixel area.

FIG. 13B is a diagrammatic view of a candidate grayscale iris pixel area surrounded by a set of eight neighboring pixel areas.

FIG. 14 illustrates different diagrammatic views of a candidate grayscale iris pixel area with different subsets of five neighboring pixel areas highlighted gray.

FIG. 19 is a flow diagram of methods of generating statistical models of a reference texture pattern and a candidate texture pattern computed for a candidate pair of candidate redeye pixel areas.

FIG. 20 shows a set of eigen-images corresponding to exemplary eye pair reference texture patterns.

FIG. 25A shows inner and outer bounding regions derived from a mapped redeye pixel area and a corresponding mapped grayscale iris pixel area.

FIG. 25B shows inner and outer redeye pixel corrections regions used in an embodiment of a method of correcting redeye in a digital image.

FIG. 26 is a graph of darkening factors plotted as a function of a green color component value of a pixel of an input image.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In general, the redeye detection and correction embodiments described herein may be incorporated into any system or method in which such functionality is desired. These embodiments, however, are particularly suitable for incorporation into embedded environments, which typically have limited processing and memory resources.

I. System Overview

Figure 1:
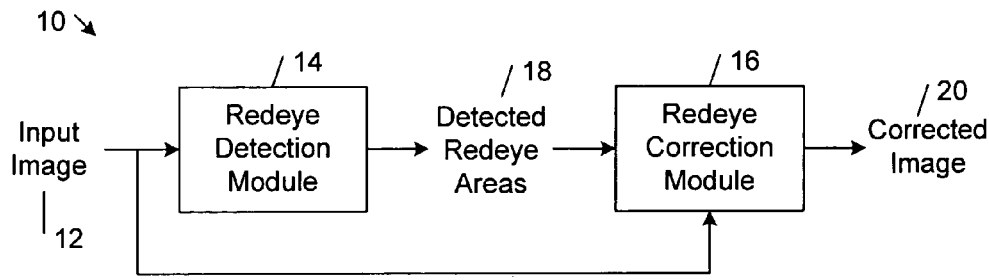
FIG. 1 is a block diagram of an embodiment of a system for detecting and correcting redeye in a digital image.

FIG. 1 shows an embodiment of a system 10 for detecting and correcting redeye pixels in a digital input image 12 that includes a redeye detection module 14 and a redeye correction module 16. Red eye detection module 14 automatically detects areas 18 in input image 12 likely to contain redeye. Redeye correction module 16 automatically corrects the detected redeye areas 18 to generate a corrected image 20. In general, the redeye detection and redeye correction modules 14, 16 of system 10 are not limited to any particular hardware or software configuration, but rather they may be implemented in any computing or processing environment, including in digital electronic circuitry or in computer hardware, firmware, device driver, or software. These redeye detection and redeye correction modules 14, 16 may be embedded in the hardware of any one of a wide variety of electronic devices, including digital cameras, printers, and portable electronic devices (e.g., mobile phones and personal digital assistants).

Figure 2:
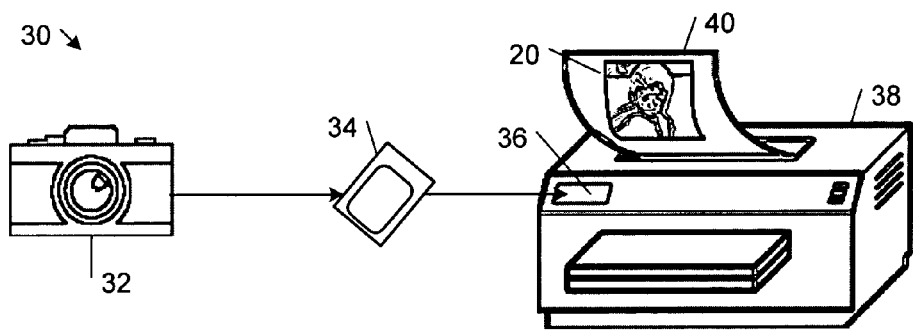
FIG. 2 is a diagrammatic view of a printer system incorporating an embedded embodiment of a system for detecting and correcting redeye in a digital image.

FIG. 2 shows an exemplary application environment 30 for the detection and correction embodiments described herein. A digital camera 32 (e.g., an HP® PHOTOSMART® digital camera available from Hewlett-Packard Company of Palo Alto, Calif., U.S.A.) captures images of scenes and stores the captured images on a memory card 34 (e.g., a secured digital (SD) multimedia card (MMC)). The memory card 34 may be plugged into a slot 36 of a printer system 38 (e.g., a PHOTOSMART® printer, which is available from Hewlett-Packard Company of Palo Alto, Calif., U.S.A.). Printer system 38 accesses data corresponding to an input image stored on the memory card 34, automatically detects and corrects redeye in the input image, and prints a hard copy 40 of the corrected image 20. In some implementations, printer system 38 displays a preview of the corrected image 20 and awaits user confirmation to proceed with printing before the corrected image 20 is printed.

Figure 3:
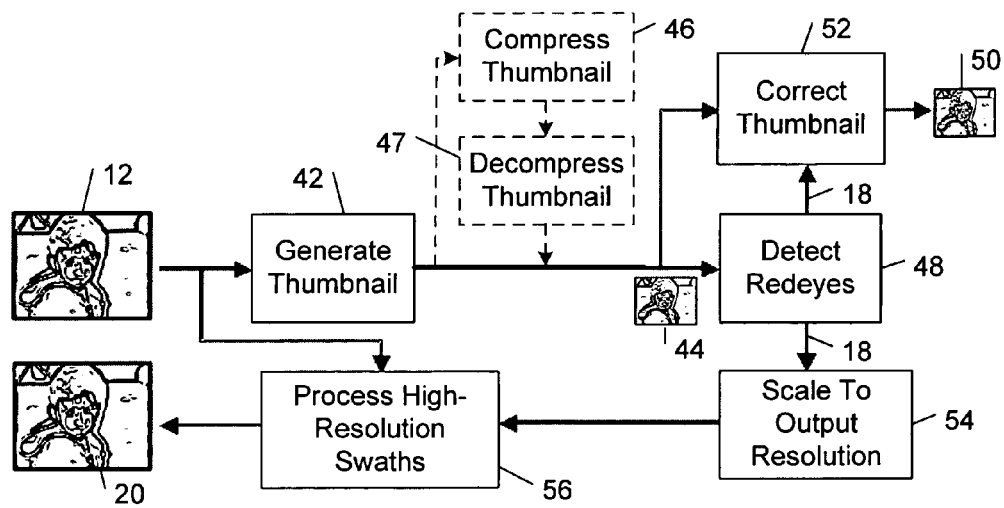
FIG. 3 is a flow diagram of an embodiment of a method of detecting and correcting redeye in a digital image.

FIG. 3 shows a work flow diagram of an implementation of a redeye detection and correction process that is adapted for the printer system application environment 30 of FIG. 2. In this process implementation, the input image 12 is subsampled to generate a thumbnail image (step 42). The thumbnail image optionally is compressed to generate a compressed thumbnail image and, thereby, reduce the memory required to store thumbnail image 44 (step 46). The compressed thumbnail image is decompressed for subsequent processing (step 47). Redeye detection module 14 detects redeye regions 18 in the compressed thumbnail image 44 (step 48). Based on the detected redeye areas 18, redeye correction module 16 corrects the compressed thumbnail image 44 to generate a corrected (and decompressed, if necessary) thumbnail image 50 (step 52). Because redeye detection module 14 operates on a thumbnail of the original input image 12, redeye detection module 14 can rapidly detect redeye regions in environments in which one or both of the processing resources and the memory resources are limited.

In response to user confirmation to proceed with printing, redeye correction module 16 maps the detected redeye areas 18 to a version of the input image scaled to a prescribed output resolution (step 54). Redeye correction module 16 corrects redeye in the input image at the prescribed output resolution to generate the corrected image 20 (step 56). As explained in detail below, in some implementations, the redeye correction module 16 corrects redeye on a line-by-line basis without reference to pixel data in adjacent lines. In this way, redeye correction module 16 may operate in embedded environments in which one or both of the processing resources and the memory resources are severely constrained, while still providing exceptional real-time redeye correction results.

In some implementations, the redeye correction module 16 automatically corrects the detected redeye pixel areas without awaiting user confirmation.

As explained in detail below, redeye detection module 14 detects redeye regions in a way that compensates for errors and other artifacts that are inherently introduced by the subsampling, compressing, and scaling steps so that redeyes in the input image area detected with high accuracy. In addition, redeye correction module 16 corrects redeye pixels detected in input image 12 in a way that appears natural and that handles special classes of redeye, such as glowing redeyes, that are detected by the redeye detection module 14.

II. Detecting Redeye Pixel Areas

Figure 4:
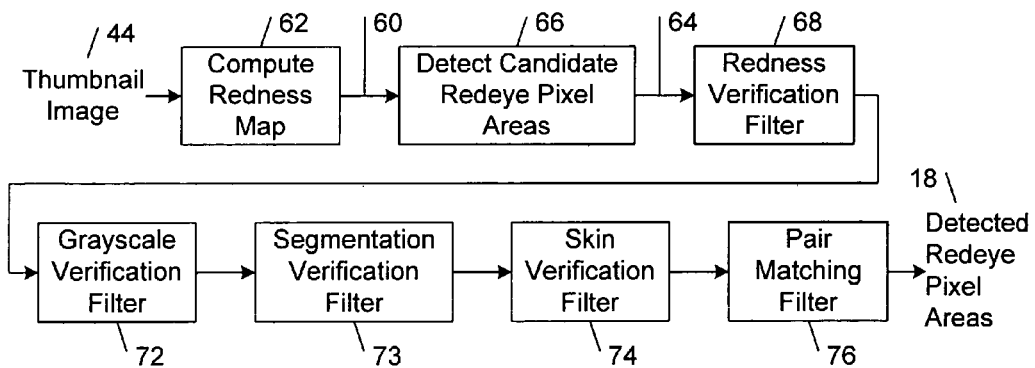
FIG. 4 is a flow diagram of steps in an embodiment of a process of detecting redeye in a digital image.
Figure 5:
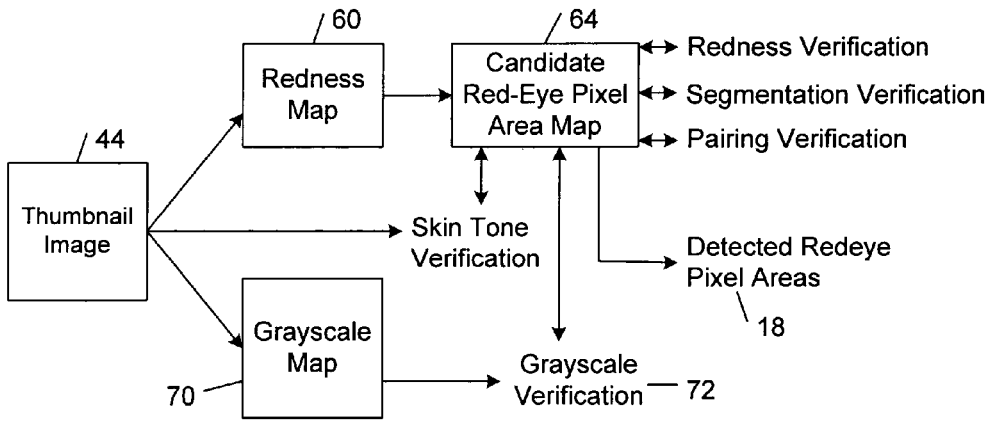
FIG. 5 is an information flow diagram of different image maps derived from an input image and different processing steps applied to the image maps in an embodiment of a process of detecting and correcting redeye in a digital image.

Referring to FIGS. 4 and 5, in some implementations, redeye detection module 14 automatically detects redeye in thumbnail image 44 as follows. Redeye detection module 14 computes a redness map 60 based on the thumbnail image 44 (step 62) and filters the redness map 60 to generate a candidate redeye pixel area map 64 (step 66). Redeye detection module 14 filters candidate redeye pixel areas from map 64 based on a redness verification filter (step 68). In addition, redeye detection module 14 computes a grayscale map 70 and filters from the candidate redeye pixel area map 64 each candidate redeye pixel area located in an area of the thumbnail image 44 having a computed grayscale contrast relative to at least one respective neighboring pixel area that is less than a prescribed grayscale contrast threshold (step 72). Redeye detection module 14 also filters the candidate redeye pixel areas in the candidate redeye pixel area map 64 based on one or more local verification filters, including a segmentation verification filter (step 73) and a skin tone verification filter (step 74). Candidate redeye pixel areas also are paired, and any unpaired candidate redeye pixel areas are filtered from map 64 (step 76). The candidate redeye pixel areas remaining in redeye pixel area map 64 correspond to the detected redeye pixel areas 18, which are used by redeye correction module 16 to generate corrected image 20.

A. Global Screening

Global Candidate Redeye Pixel Area Detecting

Figure 6:
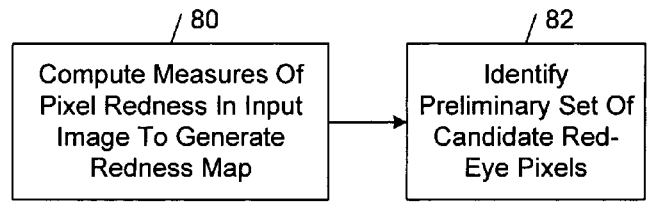
FIG. 6 is a flow diagram of steps in an embodiment of a process of detecting red-eye in a digital image.
Figure 7A:
FIG. 7A is an exemplary thumbnail image corresponding to an input image.
Figure 7B:
FIG. 7B is a redness map derived from the thumbnail image of FIG. 7A.

Referring to FIG. 6, in operation, redeye detection module 14 initially computes measures of pixel redness in the thumbnail image 44 to generate redness map 60 (step 80). Any one of a variety of different measures of pixel redness may be used to generate redness map 60 from thumbnail image 44. In some embodiments, the pixel redness measures are computed based on a ratio of a measure of a red component of pixel energy to a measure of total pixel energy. For example, in one implementation, pixel redness measures (R) are computed as follows:

$$R = \frac{\alpha \cdot r + \beta \cdot g + \gamma \cdot b}{r + g + b + d} \quad (1)$$

where r, g, and b are red, green, and blue component pixel values of input image 12, respectively, $\alpha$, $\beta$ and $\gamma$ are weighting factors, and d is a prescribed constant with a value selected to avoid singularities and to give higher weights to bright pixels. In one exemplary implementation in which each of r, g, and b have values in the range of [0,255], $\alpha$=255, $\beta=\gamma=0$, and d has a value of 8. As shown in FIGS. 7A and 7B, based on the mapping of equation (1), redeye detection module 14 maps the redness of each pixel of thumbnail image 44 to a corresponding pixel of the redness map 60 having a redness value given by equation (1).

In one exemplary implementation, pixel redness measures (R0) for redness map 60 are computed as follows: R0=(255·r)/(r+g+b+d) when r>g, r>b; otherwise R0=0. Other representative redness measures (R1, R2, R3, R4) that may be used to compute redness map 60 are expressed in equations (2)-(5) below:

$$R1 = \frac{r^2}{(r + g + b + 1)^2} \quad (2)$$

$$R2 = \frac{r^2}{(g + b)^2} \quad (3)$$

$$R3 = \frac{r + b}{(r + g + b + 1)} \quad (4)$$

$$R4 = \frac{Cr}{(Cb + 1)^2} \quad (5)$$

where r, g, and b are red, green, and blue component pixel values of input image 12, respectively, and Cr and Cb are the red and blue chrominance component pixel values of the input image 12 in the YCbCr color space.

Figure 8A:
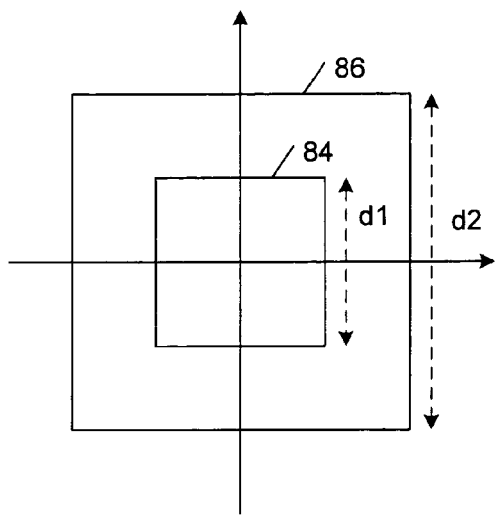
FIG. 8A is a diagrammatic view of a two-dimensional redness filter that includes a kernel pixel area and a surrounding pixel area.
Figure 8B:
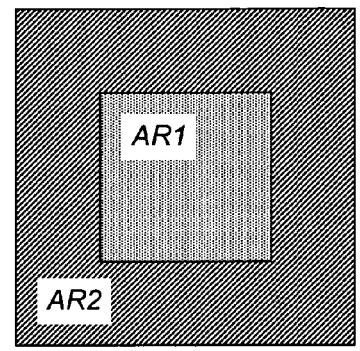
FIG. 8B is a diagrammatic view of the two-dimensional redness filter of FIG. 5A with the kernel pixel area labeled AR1 and the surrounding pixel area labeled AR2.

Referring back to FIG. 6 and to FIGS. 8A and 8B, redeye detection module 14 identifies a preliminary set of candidate redeye pixels in the redness map 60 (step 82; FIG. 6). In some implementations, the preliminary set of candidate redeye pixels is identified by applying a two-dimensional redness filter to the redness map 60. In one exemplary implementation, the following two-dimensional redness finite impulse response (FIR) filter is applied to the pixel redness measures of the redness map 60:

$$f(x, y) = \begin{cases} 1 & \text{if } (|x| < d1) \text{ and } (|y| < d1) \\ -1 & \text{otherwise} \end{cases} \quad (6)$$

The two-dimensional redness filter is defined with respect to a central kernel pixel area and a pixel area surrounding the kernel pixel area. As shown in FIGS. 8A and 8B, the particular FIR filter implementation of equation (6) is defined with respect to a square kernel pixel area 84 (AR1) of side length d1 and a surrounding pixel area 86 (AR2) corresponding to a rectangular path defined between a square pixel area of side length d2 and the central kernel pixel area 84, where d1<d2 (e.g., d2=2·d1). In some implementations, the average values of the pixels within the kernel area AR1 and the surrounding area AR2 may be computed using integral image processing, where an integral image S(x, y) for an input image I(x, y) is defined as:

$$S(x, y) = \sum_{i=0}^{x} \sum_{j=0}^{y} I(i, j) \quad (7)$$

Given the integral image S, the sum of image pixels within an arbitrary rectangle (x1, x2) and (y1, y2) can be obtained by:

Sum(x1, x2, y1, y2)=S(x2, y2)−S(x2, y1)−S(x1, y2)+S(x1, y1)  (8)

Based on equation (8), the average value of the pixels within an arbitrary rectangle can be obtained efficiently with three integer additions/subtractions and one division. In the above-described implementation, the average pixel values $APV_{R1}$ and $APV_{R2}$ over areas AR1 and AR2, respectively, are computed and the two-dimensional FIR of equation (6) is applied to the redness map 60 to generate the following redness score (RS1) for each corresponding region of the redness map:

$$RS1 = APV_{R1} - APV_{R2} \quad (9)$$

In another implementation, a nonlinear FIR filter is applied to the redness map 60 to generate the following redness score (RS2) for each corresponding region of the redness map:

$$RS2 = APV_{R1} + w \cdot \left(\frac{APV_{R1}}{APV_{R2}}\right)^4 \quad (10)$$

where w is a constant weighting factor, which may be determined empirically. In this equation, $APV_{R1}$ represents the absolute redness of the central kernel square AR1, and ($APV_{R1}/APV_{R2}$) represents the contrast between the central square AR1 and the surrounding area AR2. The redness score RS2 of equation (10) formulates how a red dot region must be sufficiently red while also exhibiting high contrast against its surrounding regions. In the above-described implementations, redeye areas are approximated by square candidate pixel areas. In other embodiments, redeye areas may be approximated by different shapes (e.g., rectangles, circles or ellipses).

Figure 9:
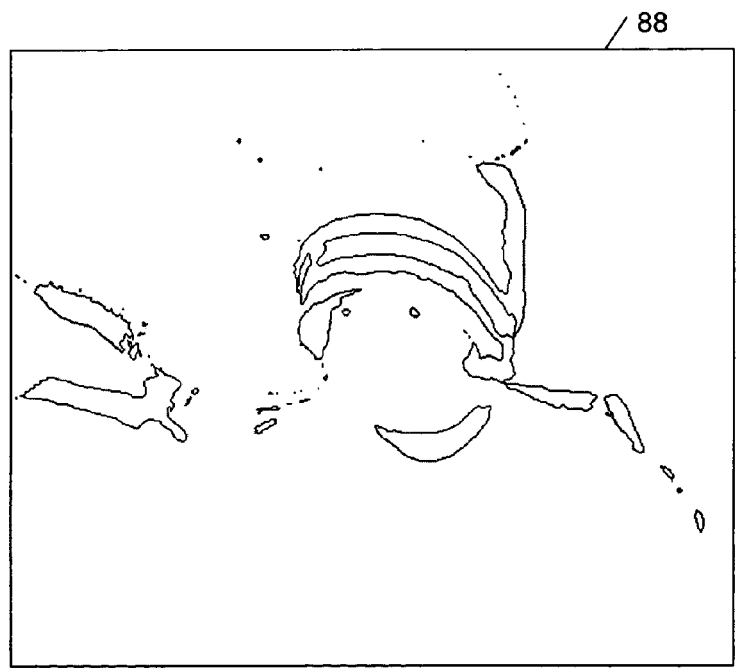
FIG. 9 is a binary candidate redeye pixel map derived from the redness map of FIG. 6B.

Referring to FIG. 9, after a set of redness scores has been computed for a selected kernel size d1, an empirically determined threshold is applied to the computed redness scores to generate a binary map identifying candidate redeye pixels. In one implementation, "0"s (black pixels) in the binary map represent background pixels and "1"s (white pixels) represent candidate redeye pixels. Multiple binary maps are generated by repeating the process of computing redness scores and thresholding for different kernel sizes. The resulting binary maps are combined by applying the OR logical operator across all binary maps at each pixel location to create a final binary map 88 identifying candidate redeye pixels. The candidate redeye pixels in the final binary map 88 are segmented into redeye and non-redeye classes based on pixel connectivity using any one of a wide variety of known pixel connectivity algorithms, and each pixel area segmented into the redeye class is labeled as a candidate redeye area. In some embodiments, the stripe-based segmentation approach described in the attached Appendix is used to segment redeye pixels in the final binary map 88. In the embodiments illustrated herein, each candidate redeye area is represented by a boundary rectangle (or box). In other embodiments, the candidate redeye pixel areas may be represented by non-rectangular shapes.

In some embodiments, a number of fast heuristics are applied to the candidate redeye areas in the final binary map 88 to eliminate false alarms. Known redeye pixel techniques may be used to eliminate false alarms (i.e., candidate redeye pixel areas that are not likely to correspond to actual redeye areas), including aspect ratio inspection and shape analysis techniques. For example, in some implementations, atypically elongated candidate redeye areas are removed from the candidate redeye pixel area map 64.

Global Candidate Redeye Pixel Area Verification

Referring to FIGS. 10, 11, 12A, and 12B, redeye detection module 14 applies verification tests to each candidate redeye area in map 64 to ensure that it is red enough itself and more red than its surroundings. These verification tests are applied to candidate redeye areas; they are not applied to individual pixels.

Figure 11:
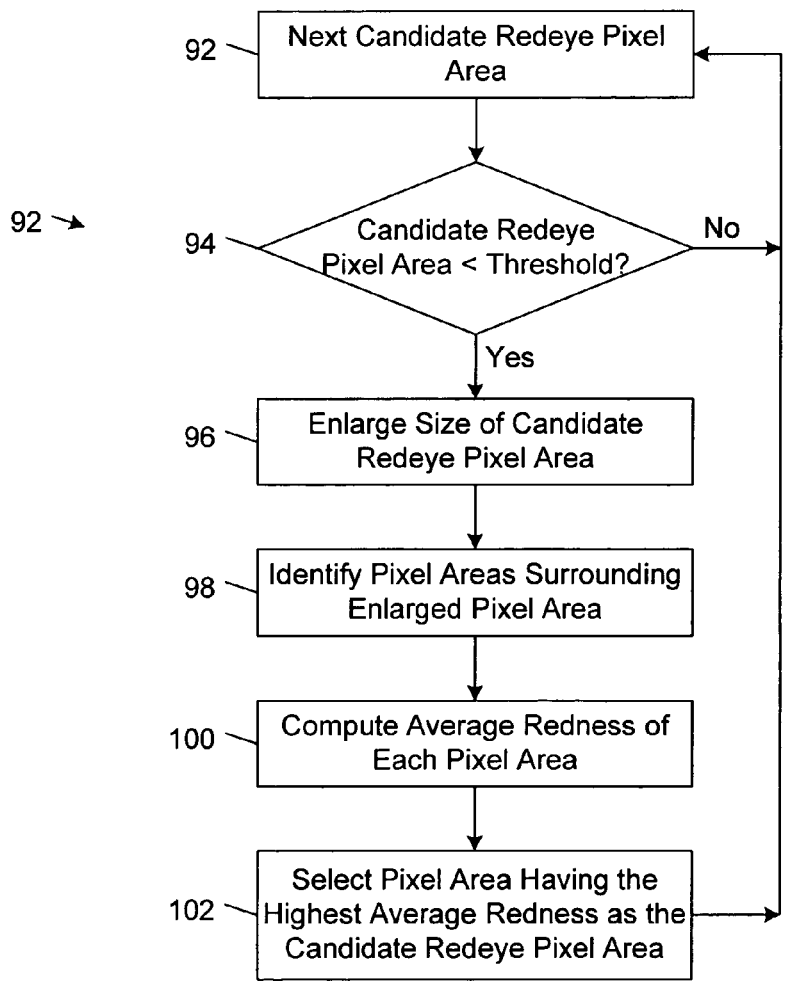
FIG. 11 is a flow diagram of a method of selecting a candidate redeye pixel area in an embodiment of a process of detecting redeye in a digital image.

Initially, small candidate redeye pixel areas are processed in order to preserve small redeye areas in the candidate redeye pixel area map 64 (step 90). As shown in FIG. 11, the size of each candidate redeye pixel area is compared with a threshold (steps 92, 94). If the size of a candidate redeye pixel area is smaller than the threshold, the candidate redeye pixel area is enlarged (step 96). For example, in some implementations, each size dimension (e.g., width or height of a rectangular candidate redeye pixel area in the illustrated embodiments) of a candidate redeye pixel area that is equal to one pixel is enlarged to two pixels. Pixels areas surrounding the enlarged candidate redeye pixel area are generated (step 98). In some implementations, the region surrounding the enlarged pixel area is divided into eight nearest neighbor pixel areas having the same size as the enlarged candidate redeye pixel area. An average redness value is computed for the set of pixel areas consisting of the enlarged candidate redeye pixel area and each of the nearest neighbor pixel areas (step 100). The pixel area in the set having the highest average redness value is selected as the candidate redeye pixel area to replace the original candidate redeye pixel area (step 102). In some implementations, if an original candidate redeye pixel area is to be enlarged in width and height by dw and dh respectively, an uncertainty region is created that overlaps with surrounding regions of the nearest neighbor pixel areas. The new location of the enlarged candidate redeye pixel area is determined by moving an enlarged box within the uncertainty region to a location that has the highest average redness value.

Referring back to FIG. 10 and to FIGS. 12A and 12B, candidate redeye pixel areas are filtered from the preliminary set of redeye candidate areas based on redness contrast thresholds (step 104). A conventional greedy search process initially is applied to each candidate redeye pixel area 106 to maximize the size of the candidate redeye pixel area 106 under the condition that the average redness of the pixels within the new redeye pixel area does not decrease. Since the candidate redeye pixel areas identified by the matched filtering process described above typically are smaller than the actual redeye areas in thumbnail image 44, the greedy search process increases the likelihood that the enlarged candidate redeye area 108 covers a redeye in the thumbnail image 44 (if any).

Next, the average redness of each enlarged candidate redeye pixel area 108 is compared with those of its eight neighboring boxes 110, each of which has the same size as the corresponding enlarged candidate redeye area 108 (see FIG. 12B). If the minimal pair-wise contrast between a given candidate redeye area 108 and the surrounding boxes is below a threshold, the given candidate redeye area is removed from the preliminary redeye candidate map. Contrast values are computed based on the difference between the average redness of the pixels of the candidate redeye area 108 (CenterAverage) and the average redness of the pixels of each of the neighboring area (NeighborAverage[k], where k=1, 2, . . . , 8). If the following condition is satisfied, the candidate redeye pixel area is removed from the candidate redeye pixel map 64:

$$\text{MIN (CenterAverage−NeighborAverage}[k])<\text{CMIN} \quad (11)$$

where k=1, 2, . . . , 8, MIN is a function that computes the minimum of the computed contrast measures, and CMIN is an empirically determined minimum redness contrast threshold. If the condition of equation (11) is not satisfied, the candidate redeye area under test is sent for further verification.

Figure 10:
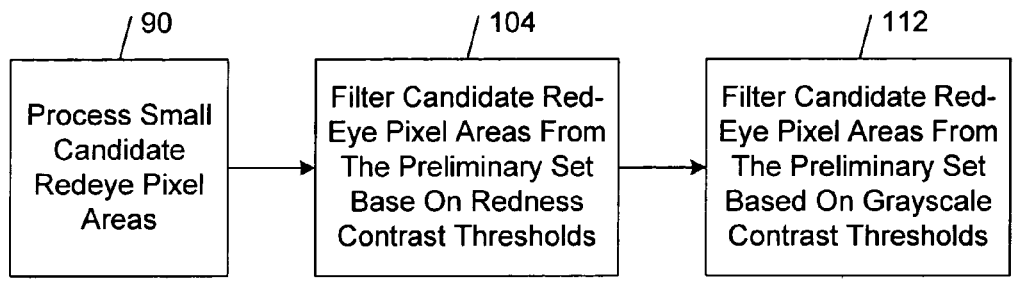
FIG. 10 is a flow diagram of global verification steps in an embodiment of a process of detecting redeye in a digital image.

Referring to FIGS. 10, 13A, 13B, and 14, in some embodiments, redeye detection module 14 filters the candidate redeye pixels areas remaining after the above-described redness verification process from the candidate redeye area map 64 based on grayscale contrast thresholds (step 112; FIG. 10). In this process, a candidate redeye pixel area is filtered based on whether it is darker than surrounding areas. Initially, grayscale map 70 (FIG. 5) is computed by mapping the pixels of thumbnail image 44 in accordance with a grayscale mapping G, given by G=MIN(G1, G2), where MIN is a function that outputs the minimum of G1 and G2, which are given by:

$$G1=0.299 \times r+0.587 \times g+0.114 \times b \quad (12)$$

$$G2=0.299 \times (255-r)+0.587 \times g+0.114 \times b \quad (13)$$

where r, g and b are red, green and blue values for each pixel within the region and the grayscale values are obtained for each pixel and averaged over the region. In this grayscale mapping, G1 is a conventional grayscale mapping computed from (r, g, b), whereas G2 is the grayscale mapping computed from (255−r, g, b). The grayscale mapping G2 handles instances of "glowing" redeyes (i.e., when a redeye are appears much brighter than its surroundings). In accordance with the above approach, such atypical "glowing" redeyes are mapped to a grayscale channel that allows them to be treated in the same way as typical redeyes.

A known search technique is performed over the computed grayscale map 70 to locate one or more areas corresponding to irises. In the illustrated embodiment, an iris area is represented as a square. In this embodiment, each candidate redeye pixel area 108 remaining after the above-described redness verification process is assumed to correspond to a respective pupil area, which has a size that is equal to or smaller than the corresponding iris area 114 (shown as a square in FIG. 13A). Note that each candidate redeye area 108 is not necessarily identical to its associated grayscale iris area 114. In this search algorithm design, it is assumed that the iris area 114 shares the same center with its candidate redeye area 108. The size of the iris area 114 is determined based on a comparison of a candidate square box 116 with each of its eight nearest neighbors (numbers 0-7 in FIG. 13B). In particular, an initial area that encompasses the surrounding areas 0-7 is partitioned into nine equal-sized nearest neighbor boxes (numbered 0-9). The size of the final optimal grayscale box 114 (or square) is determined by selecting a size that maximizes the grayscale contrast between the center box 116 (box 8) and its surrounding neighbors (boxes 0-7). In this search process, only one variable is involved: the side length of the center box 116. In one implementation, a brute force search technique is used to determine the final size of grayscale iris area 114.

Once the final size of the grayscale iris area (or box) 114 is determined, the grayscale contrast between the final grayscale iris area 114 and the surrounding boxes (0-7) are used to verify that the iris area corresponds to an actual iris in the thumbnail image 44. As illustrated in FIG. 14, the area surrounding a candidate iris area 114 is partitioned into eight equal sized boxes. The average grayscale of a box k is denoted as N(k), k=0, 1, . . . , 8 (where N[8] corresponds to the center iris box). Each of the circular subsets 120, 122, 124, 126, 128, 130, 132, 134, which consist of a respective set of five consecutive neighboring boxes, may be denoted by:

$$\{N(k\%8), N((k+1)\%8), \ldots, N((k+4)\%8)\} \quad (14)$$

where % is the modulo operator and k=0, 1, . . . , 7. This enables situations in which a redeye is located at the edge of a face in the thumbnail image 44 to be handled. Out of the eight subsets of surrounding boxes, the most uniform subset 120-134 is selected as the basis for computing a measure of grayscale contrast (CGRAY) with the central candidate box. That is:

$$\text{CGRAY}=\text{AVER}\{N(m\%8), N((m+1)\%8), \ldots, N((m+4)\%8)\}/N(8) \quad (15)$$

where m=argmin STD $\{N(k\%8), N((k+1)\%8), \ldots, N((k+4)\%8)\}$, k=0, 1, . . . 7, AVER$\{a(1), a(2), \ldots, a(n)\}$ represents the average of array $\{a(k)\}$, and STD$\{a(1), a(2), \ldots, a(n)\}$ represents the standard deviation of array $\{a(k)\}$. Based on the grayscale contrast computation of equation (15), candidate redeye pixel areas having corresponding candidate iris areas with computed contrast measures below an empirically determined threshold are removed from the candidate redeye pixel area map 64.

B. Local Verification

Referring back to FIG. 4, after the above-described global redness and grayscale verification filters have been applied (steps 68, 72), the candidate redeye pixel area map 64 contains a set of candidate redeye pixel areas 108 each of which is likely to correspond to the approximate location and size of a redeye area in thumbnail image 44. In some embodiments, redeye detection module 14 applies one or more local verification processes to the candidate redeye pixel area map 64 to further filter candidate redeye pixel areas from the candidate redeye pixel area map 64. In the following embodiments, a segmentation verification filter and a skin tone verification filter are applied to localized areas of the thumbnail image 44 to verify candidates in the candidate redeye pixel area map 64 (steps 73, 74). These classification techniques are modeled based at least in part on the observation that a typical redeye is a red region (i.e., the iris), surrounded by a non-red region (i.e., the white areas of the eye), and further surrounded mostly by a skin tone region (i.e., the face).

Segmentation Verification

The segmentation verification filter is applied to the redness map 60 to ensure that each of the candidate redeye pixel areas 108 exhibits high contrast relative to surrounding neighboring areas (step 73; FIG. 4).

Figure 15A:
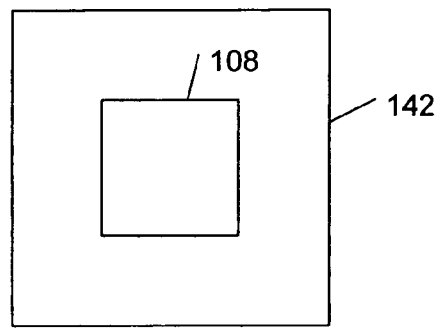
FIG. 15A is an exemplary candidate redeye pixel area surrounded by a neighborhood area.

As shown in FIG. 15A, a candidate redeye pixel area 108 is enlarged by a predetermined ratio to generate a neighborhood pixel area 142. In one implementation, the neighborhood pixel area 142 is obtained by enlarging the dimensions of a given candidate redeye pixel area 108 by 120% (i.e., the new width/height is 220% of the original width/height). The region of redness map 60 corresponding to the neighborhood pixel area 142 is binarized by applying a threshold computed based on the statistics of the redness value within the redness pixel area 108. For example, in one implementation, the binarization threshold is calculated as follows:

$$T = \begin{cases} 0.93 * AVE(R_1, R_2, \ldots, R_n) & \text{when size of the candidate box bigger than 8} \\ 0.93 * MED(R_1, R_2, \ldots, R_n) & \text{otherwise} \end{cases} \quad (16)$$

where $R_1, R_2, \ldots, R_n$ denote the redness of the n pixels located within the given candidate redeye pixel area, and the AVE(.) function computes the average and the MED(.) function computes the median of an input array.

Figure 15B:
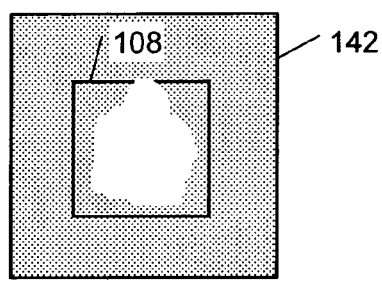
FIG. 15B is an image produced by thresholding a redness classification map in region of an exemplary input image corresponding to the neighborhood area and the candidate redeye pixel area of FIG. 15A.
Figure 15C:
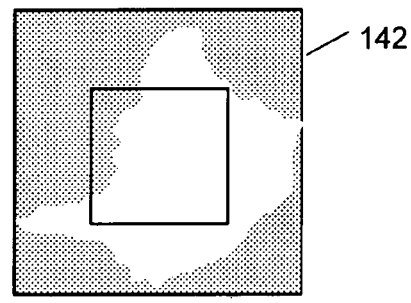
FIG. 15C is an image produced by thresholding a redness classification map in a region of another exemplary input image corresponding to the neighborhood area and the candidate redeye pixel area of FIG. 15A.

Exemplary binarized regions of redness map 60 corresponding to neighborhood pixel area 142 are shown in FIGS. 15B and 15C, in which white areas correspond to pixels classified as "red" and dark areas correspond to pixels classified as "non-red". The segmentation verification filter analyzes the morphological feature of the binary region corresponding to pixel area 142 as follows. First, the binary region is segmented into objects based on pixel connectivity. In some embodiments, the stripe-based segmentation approach described in the attached Appendix is used to segment regions of the binarized redness map 60. The object with the largest overlapping area with the redeye pixel area 108 is examined to see if it touches the binary region boundary (i.e., the boundary of 142). If a touching condition is detected, the corresponding candidate redeye pixel area is removed from the candidate redeye pixel map 64. Accordingly, upon application of the segmentation verification filter to the exemplary neighborhood pixel areas shown FIGS. 15B and 15C, the candidate redeye pixel area corresponding to the neighborhood pixel area of FIG. 15B would not be filtered from candidate redeye pixel area map 64, whereas the candidate redeye pixel area corresponding to the neighborhood pixel area of FIG. 15C would be filtered from candidate redeye pixel area map 64.

Skin Tone Verification

Candidates may be filtered from the candidate redeye pixel area map 64 based on a skin tone verification process modeled at least in part on the observation that a redeye is a non-skin-tone region (i.e., the eye) surrounded by a skin tone region (i.e., the face). In this process, pixels in the thumbnail image 44 are classified as corresponding to either a skin tone area or a non-skin tone area. Any skin tone classification technique may be used to classify pixels of thumbnail image 44.

Figure 16A:
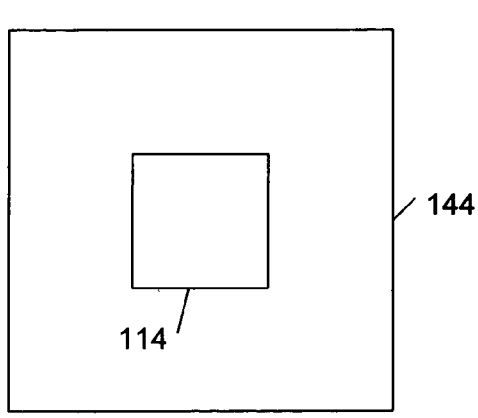
FIG. 16A is an exemplary grayscale iris area surrounding by a neighborhood area.

As is illustrated in FIG. 16A, the grayscale iris area 114 obtained during the grayscale verification process described above is used as a base area for the candidate redeye pixel area. A neighborhood pixel area 144 is defined by extending the base area by a fixed ratio, and the pixels of the thumbnail image 44 located within this neighborhood pixel area 144 are classified by a skin tone classification algorithm. In one implementation, skin tone verification filter classifies pixels based on the skin tone classification algorithm described in C. Garcia and G. Tziritas, "Face detection using quantized skin color regions merging and wavelet packet analysis", IEEE Trans. Multimedia, vol.1, no. 3, September 1999, which is incorporated herein by reference. The percentage of the pixels classified as skin tone pixels is compared with a predefined, empirically determined threshold. Candidate redeye pixel areas corresponding to regions having a percentage of skin tone pixels below the threshold are filtered from the candidate redeye pixel area map 64.

Figure 16B:
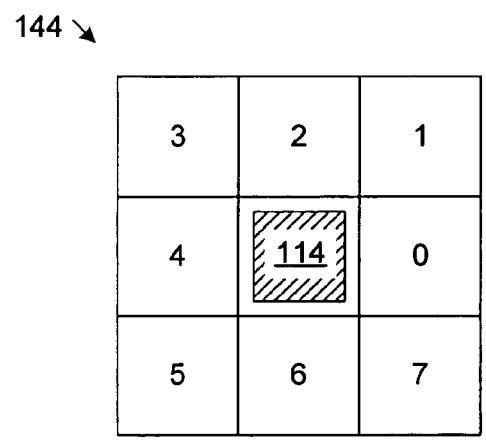
FIG. 16B is another exemplary grayscale iris area surrounded by a set of eight neighborhood areas.

Referring to FIG. 16B, in another implementation of the skin tone verification filter, the neighborhood pixel area 144 is uniformly divided into nine rectangles. In one implementation, the neighborhood pixel area 144 is obtained by extending the grayscale iris area 114 by 140%. After excluding the center rectangle, the remaining rectangles are numbered from 0 to 7. The percentage of skin tone pixels within each of these eight surrounding rectangles 0-7 is counted individually and denoted as s(k), k=0, 1, ..., 7. The skin tone verification filter computes the circular sum of the array s(k), as follows:

$$CS(k)=s(k\%8)+s((k+1)\%8)+s((k+2)\%8)+\ldots+s((k+4)\%8), k=0,1,\ldots,7 \quad (17)$$

A given candidate redeye pixel area passes this skin tone verification test (i.e., is not filtered from candidate redeye pixel area map 64) only if the maximum of CS(k) is above a predefined threshold.

Pairing Verification

Referring back to FIG. 4, after the above-described global redness, global grayscale, and local segmentation and skin tone verification filters have been applied (steps 66, 68, 72, 73, 74), the candidate redeye pixel area map 64 contains a set of candidate redeye pixel areas each of which is likely to correspond to the approximate location and size of a redeye area in thumbnail image 44. In some embodiments, redeye detection module 14 applies a local pair matching verification filter 76 to further filter candidate redeye pixel areas from the candidate redeye pixel area map 64. In these embodiments, candidate redeye pixel areas are grouped into pairs. This process reduces the number of false alarms and ensures that only paired redeyes are corrected to avoid any unnatural appearance that might result from the correction of only one of a pair of eyes of a person appearing in input image 12. Pseudo-code corresponding to steps of one exemplary implementation of this pairing local verification process is provided below:

```
1.  For each redeye candidate (b1) {
2.    If its red box has not been paired with any other box {
3.      Search in the neighborhood of this red box for other
        red boxes
4.      For each redeye candidate (b2) whose red box totally
        inside the neighborhood {
5.        if boxes of (b1) and (b2) have similar size {
6.          if (b1) and (b2) pass texture pattern
            verification {
7.            mark (b1) and (b2) as paired
8.        }
9.     }
10. }
```

-continued

```
11.  }
12.  For each redeye candidate (b) {
    13.  If (b) is not paired {
        14.    remove (b) from the candidate list
    15.  }
16.  }
```

Figure 17:
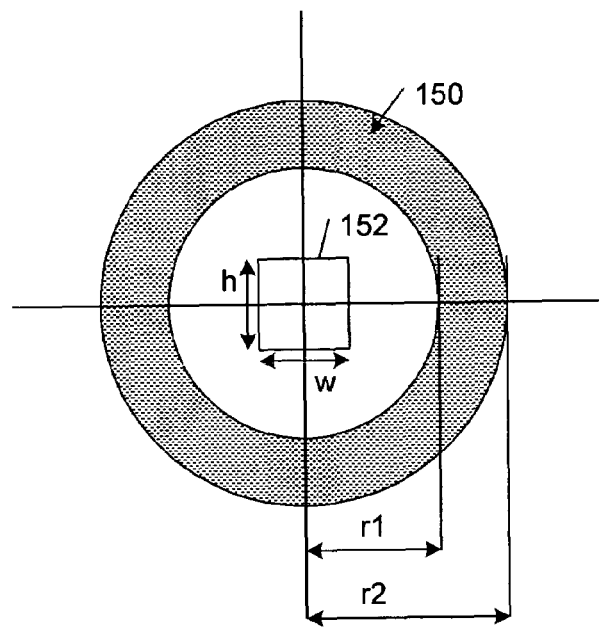
FIG. 17 is a diagrammatic view of two concentric circles illustrating a geometry used in an embodiment of a redeye candidate pairing process.

In above-described process, a pairing candidate is detected for each current redeye candidate by searching for other candidate redeye pixel areas in the candidate redeye pixel area map 64 in neighboring areas that are located within a fixed distance range with respect to the current candidate (line 3 above). Referring to FIG. 17, in some implementations, the neighboring search area 150 with respect to a candidate redeye area 152 is illustrated as a hatched circular region, which is defined by two concentric circles. These two circles are centered with respect to a candidate redeye area 152 under test. The radii (r1, r2) of the concentric circles may be determined based on the size of the current red box. For example, in some implementations, if the height and the width of the current candidate redeye area 152 is h and w, the radii (r1, r2) of the concentric circles are set to:

$$r1 = (h+w) \times 1.5 \quad (18)$$

$$r2 = (h+w) \times 6.5 \quad (19)$$

In some embodiments, paired candidate redeye pixel areas also are required to be similar in size. For example, in the pseudo code implementation of the pairing local verification process described above (line 5), the size of two candidate redeye pixel areas are compared to make sure that they are similar enough. For example, in some embodiments, if the candidate redeye pixel areas being paired are squares of lengths s1 and s2, respectively, and $s1 \leq s2$, then the two candidate redeye pixel areas are labeled as pairs if the ratio s2/s1 is less than a prescribed mismatch threshold. In one exemplary implementation, the mismatch threshold is set to a value of 2.6.

Figure 18A:
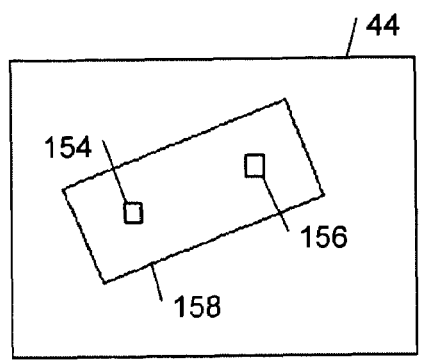
FIG. 18A is a diagrammatic view of a candidate redeye pair region detected in an input image.
Figure 18B:
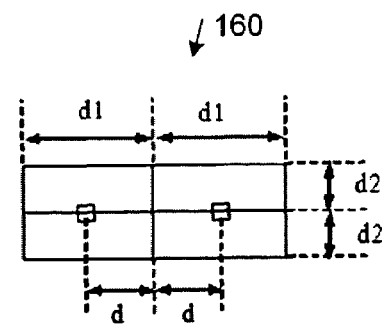
FIG. 18B is a diagrammatic view of a standardized candidate redeye pair template.

The texture pattern verification step at the line 6 of the above pseudo code verifies that the grayscale texture of a neighborhood template defined by the two pairing candidates is similar enough to a human eye pattern. Referring to FIGS. 18A and 18B, the locations of redeye candidate pixel areas 154, 156 of a candidate pair determine a neighborhood region 158 that corresponds to a standardized template 160. The form factors d1 and d2 of the standardized template 160 are determined based on eye distance 2·d. For example, in one implementation, d1 is set to 3d and d2 set to d. Given the standardized template design, the neighborhood region 158 of an arbitrary pair of redeye candidates can be constructed as illustrated in FIG. 18A.

Referring to FIGS. 19 and 18A, a reference texture pattern may be generated in a prior offline training stage, as follows. For each sample thumbnail image 174 in a set of multiple sample thumbnail images, feature point locations (i.e., locations of paired eyes) are labeled by a human administrator (step 176). Based on the labeled feature points, a neighborhood pixel region 158 corresponding to an eye pair is computed and the sample thumbnail image 174 is cropped, rotated and scaled (block 178). The neighborhood pixel region also is linearly normalized (block 180) and histogram equalized (block 182) to generate a reference redeye pair region. Any type of linear normalization and histogram equalization processes may be used. In some implementations, the reference redeye pair region is converted to a feature vector by stacking up its pixel grayscale values. A statistical model is then trained to represent the distribution of the feature vectors generated from the sample thumbnail images 174 (block 184).

In one embodiment, the template size is set to 7 by 21 pixels (i.e., d=7 in FIG. 18B), and this will form a feature vector of 147 components. The distribution of the feature vectors is modeled as Gaussian distribution. A PCA (Principle Component Analysis) is used to decompose the feature space into a low-dimension subspace spanned by the first few eigenvectors, and a subspace orthogonal to the eigenvector space (block 184). Exemplary eigenvectors (or eigen-images) obtained from the PCA are shown in FIG. 20.

During the pair matching verification process, the pair matching filter identifies the neighborhood region 158 (FIG. 18A) in thumbnail image 44 based on the detected redeye pixel areas in the candidate redeye pixel area map 64 (block 162). The region of the thumbnail image 44 corresponding to the computed neighborhood region 158 in the grayscale channel (which may be approximated in some embodiments by the green channel in the RGB color space) is cropped, scaled and rotated to generate a candidate pair region of standard size (block 164). In one implementation, the candidate pair region size is 21 pixels by 7 pixels. The candidate pair region is further normalized using linear normalization (block 166) and histogram equalization (block 168). The same linear normalization and histogram equalization processes that are used in the training stage are used in the verification stage. A feature vector of standard length 147 is generated (step 170).

The generated statistical model (block 170) is tested using the statistical model generated in the training stage (block 184) to verify whether the candidate pair region corresponds to an eye pattern or not (block 172). For example, in one implementation, two distance features are computed to measure its similarity to the trained reference eye pair pattern: a distance within the low-dimension eigenvector space, and a distance from the low-dimension eigenvector space. See, for example, K.-K. Sung, Learning and example selection for object and pattern detection, Ph.D. thesis, MIT Al Lab, 1996, which is incorporated herein by reference.

C. Redeye Detection at Multiple Resolutions

Figure 21:
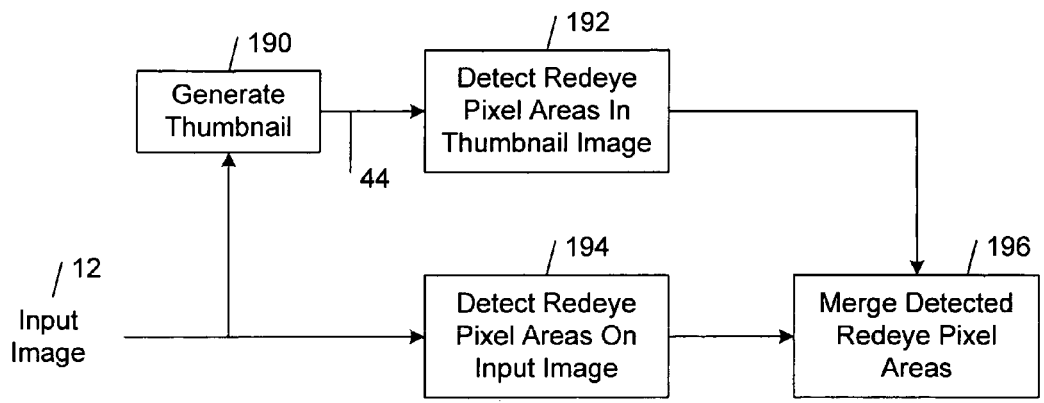
FIG. 21 is a flow diagram of an embodiment of a method of detecting redeye in an input image based on redeye detection at multiple image resolutions.

Referring to FIG. 21, in some embodiments, input image 12 is sub-sampled to generate thumbnail image 44, which may or not be compressed, (block 190). Redeye pixel areas are detected in thumbnail image 44 using one or more of the methods described above (block 192). In addition, redeye pixel areas are detected in input image 12 (block 194). Redeye pixels areas in input image 12 may be detected using one of the above-described redeye detection processes or using a redeye detection process described in U.S. patent application Ser. No. 10/424,419, filed Apr. 28, 2003, by Huitao Luo et al., and entitled "DETECTING AND CORRECTING RED-EYE IN A DIGITAL IMAGE," which is incorporated herein by reference. The two sets of redeye pixel areas that are detected in the thumbnail image 44 and the input image 12 are merged to produce a final set of detected redeye pixel areas (block 196). The final set of detected redeye pixel areas may, for example, correspond to the logical union of the two sets of detected redeye pixel areas. It has been observed that the process of detecting redeyes at multiple resolutions and merging the results frequently improves overall redeye detection accuracy.

The embodiments of FIG. 21 may be incorporated into an embedded application environment. Alternatively, these embodiments may be implemented in the form of one or more software modules that are executable on a computer system (e.g., a personal computer or a workstation).

III. Redeye Correction

A. Mapping Detected Redeye Pixels

Figure 22:
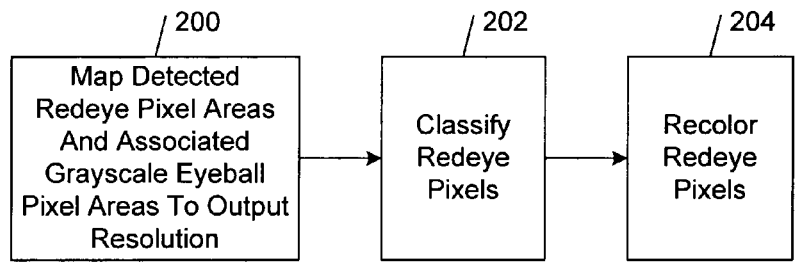
FIG. 22 is a flow diagram of an embodiment of a method of correcting detected redeye pixels.

FIG. 22 shows an embodiment of a method of correcting redeye in input image 12 based on the redeye pixel areas 18 detected by redeye detection module 14. In this embodiment, the detected redeye pixel areas 18 and the associated grayscale iris pixel areas 114 are mapped to a prescribed output resolution (block 200). For example, in the application environment of FIG. 2, the detected redeye pixel areas 18 and the associated grayscale iris pixel areas 114 are mapped from the resolution of thumbnail image 44 to the output resolution at which printer system 30 will produce image 20. In general, the output resolution of printer system 30 depends on the selected print mode (e.g., "draft" print quality, "normal" print quality, and "high" print quality) and the selected size of the media on which image 20 will be printed. For example, assuming image 20 is to be printed on a 4-inch by 6-inch piece of photo paper at a printer resolution of 300 dpi (dots per inch), the detected redeye pixel areas 18 and the associated grayscale iris pixel areas 114 are scaled up from a thumbnail size of 384 pixels in width by 288 pixels in height to a print image size of 1800 pixels in width by 1200 pixels in height.

In some implementations, the mapped detected redeye pixel areas are enlarged to compensate for errors that might occur as a result of the inaccuracy inherent in the quantization processes involved in mapping areas from the resolution of the thumbnail image 44 to the output resolution. In these implementations, the horizontal dimension and the vertical dimension of the mapped redeye pixel areas are enlarged by an enlargement amount that decreases with the original horizontal and vertical dimension of the mapped redeye pixel areas. For example, in one implementation, the dimensions of the mapped redeye pixel areas are enlarged as follows:

- 200%, if the original mapped dimension size is 1 pixel;
- 100%, if the original mapped dimension size is 2 pixels;
- 40%, if the original mapped dimension size is 3 pixels;
- 20%, if the original mapped dimension size is 4 to 10 pixels; and
- 5%, if the original mapped dimension size is above 10 pixels.

Figure 23:
FIG. 23 shows a detected redeye pixel area mapped to an output image resolution showing cropping lines for corner regions.

As shown in FIG. 23, in some implementations, the corners of the enlarged mapped redeye pixel areas 201 are cropped to form an octagonal shape that approximates the oval shape typical of human eye pupils. The amount by which the corners are cropped is empirically determined. In one exemplary illustration, the side dimension of each corner region corresponds to 15% of the corresponding side (horizontal or vertical) dimension of the enlarged mapped redeye pixel area 201.

B. Classifying Redeye Pixels

Referring back to FIG. 22, after the detected redeye pixel areas and the associated grayscale iris pixel areas have been mapped to the output resolution (and optionally enlarged and cropped), the pixels in the resulting mapped redeye pixel areas 201 are classified as redeye pixels and non-redeye pixels (block 202). In the illustrated embodiments, each pixel within the mapped redeye pixel area 201 is classified independently of the other mapped redeye pixel areas. In addition, pixel classification is performed per pixel and per pixel line without any reference to (or coherence with) adjacent (above or below) pixel lines.

Figure 24:
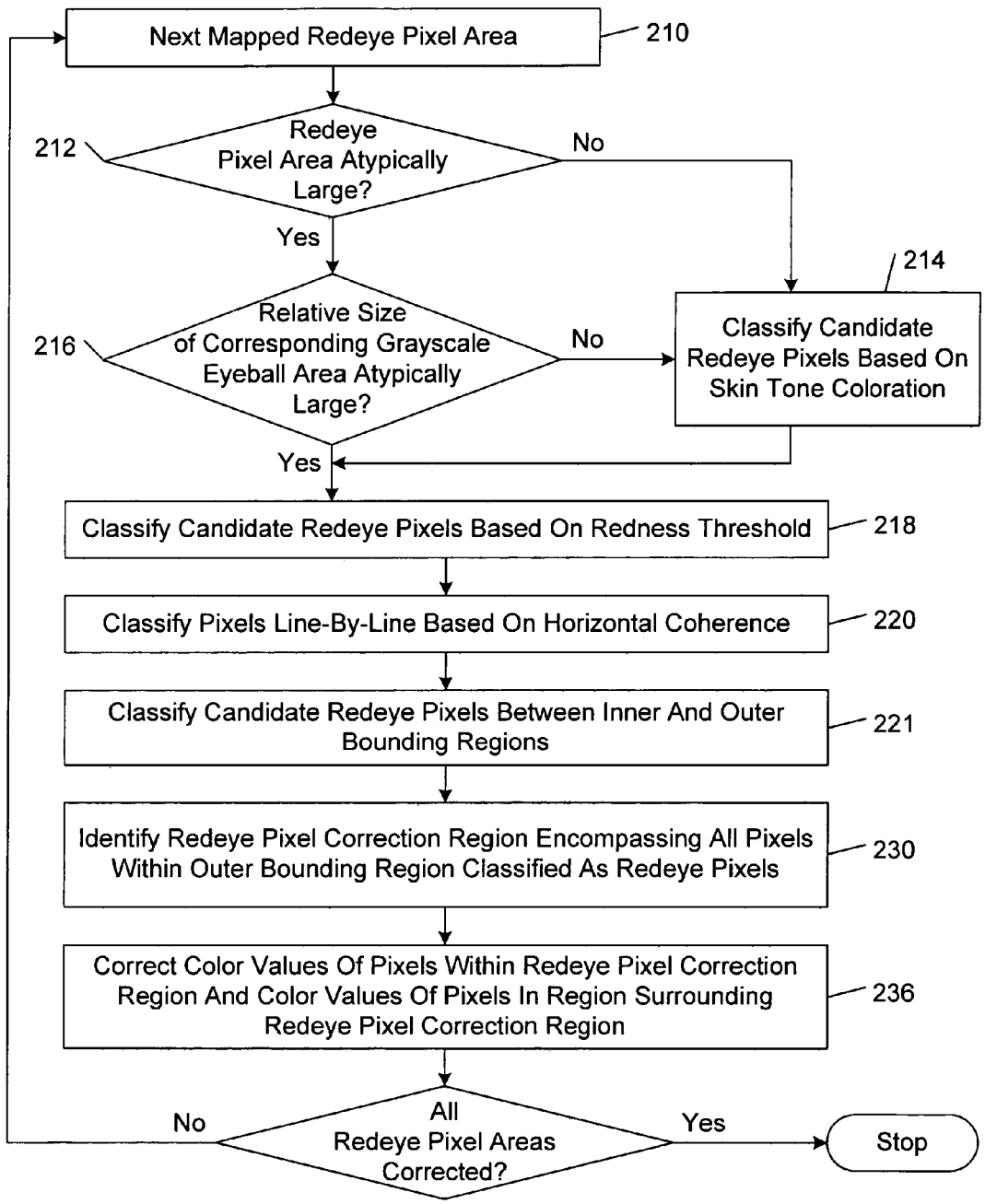
FIG. 24 is a flow diagram of a method of segmenting and correcting redeye pixels in a digital image.

FIG. 24 shows an embodiment of a sequential process of classifying redeye pixels in the mapped redeye pixel areas 201.

For each mapped redeye pixel area 201 (step 210), if the mapped redeye pixel area is not atypically large (step 212), pixels in the mapped redeye pixel area are classified as candidate redeye pixels based on skin tone coloration (step 214). In one implementation, a mapped redeye pixel area 201 is considered to be atypically large if any dimension (e.g., width or height) is larger than 10 pixels. If the redeye pixel area 201 is atypically large (step 212) but the size of the corresponding grayscale iris area relative to the mapped redeye pixel area is not atypically large (step 216), then pixels in the mapped redeye pixel area also are classified as candidate redeye pixels based on skin tone coloration (step 214). In one implementation, a mapped grayscale iris area is considered to be atypically large if its grayscale iris area is 50% larger than its corresponding mapped redeye pixel area 201. In the skin tone classification process, pixels in the input image 12 are classified as corresponding to either a skin tone area or a non-skin tone area using any type of skin tone classification or segmentation technique.

If the redeye pixel area 201 is atypically large (step 212) and the size of the corresponding grayscale iris area relative to the mapped redeye pixel area is atypically large (step 216), then it is assumed that the mapped redeye pixel area 201 is completely separated from the eyelid and surrounding skin tone regions of a person's face. In this case, the skin-tone-coloration-based pixel classification step (step 214) is omitted for the mapped redeye pixel area 201 being processed.

Candidate redeye pixels in the mapped redeye pixel areas are classified based on a pixel-based redness classification process (step 218). In one implementation, candidate redeye pixels in input image 12 having color components satisfying the following criteria are classified as candidate redeye pixels, and other candidate redeye pixels are filtered from the candidate set:

$$Cr > 128,$$

$$Cr > Cb, \text{ and}$$

$$Cr > Y, \quad (20)$$

where Cr, Cb and Y are the color components of the input image pixels represented in the YCbCr color space.

After pixels in a mapped redeye pixel area have been classified based on a redness threshold (step 218), candidate redeye pixels are classified line-by-line based on horizontal coherence (step 220). For example, in one implementation, if a given candidate redeye pixel is located adjacent to a pixel previously classified as a candidate redeye pixel and has a redness value greater than an empirically determined threshold, then the given pixel also is classified as a candidate redeye pixel.

Referring to FIGS. 24, 25A, and 25B, pixels located between an inner bounding region 222 and an outer bounding region 224 are classified as red or non-red pixels based on the above described redness and skin tone classification steps and based on a grayscale threshold (step 221).

In some embodiments, the inner bounding region 222 is centered at the center of the mapped redeye pixel area 201 being processed and has dimensions (e.g., width and height) that correspond to the average of the dimensions of the mapped redeye pixel area 201 and its corresponding grayscale iris area 226. That is, the width of the inner bounding region 22 equals one-half of the sum of the width of the mapped redeye pixel area 201 and the width of the corresponding grayscale iris area 226. Similarly, the height of the inner bounding region 22 equals one-half of the sum of the height of the mapped redeye pixel area 201 and the height of the corresponding grayscale iris area 226. The outer bounding region 224 also is centered at the center of the mapped redeye pixel area 201. In one implementation, the dimensions of the outer bounding region are 50% larger than the corresponding dimensions of the inner bounding region 222 if the inner bounding region 222 is larger than two pixels; otherwise, the dimensions of the outer bounding region are 200% larger than the corresponding dimensions of the inner bounding region 222.

In addition to redness and skin-tone coloration, pixels between the inner and outer bounding regions 222, 224 are classified based on application of a grayscale threshold to the grayscale values of the pixels as follows. In some implementations the green channel in RGB color space is used to approximate the grayscale values of pixels. In one implementation, the applied grayscale threshold corresponds to the average of the average of the grayscale values within the inner bounding region 22 and the average of the grayscale values between the inner and outer bounding regions 222, 226. For example, if the average of the gray values within the inner bounding region 222 is 90 and the average of the gray values outside the inner bounding region 222 but within the outer bounding region is 224, then the average gray value 105 ((90+120)/2) is the grayscale threshold used to segment the pixels between the inner and outer bounding regions 222, 224. Pixels between the inner and outer bounding regions 222, 224 having grayscale values below the computed grayscale threshold are classified as candidate redeye pixels.

All candidate redeye pixels within the outer bounding region 224 are classified as redeye pixels based on connectivity, with stringent requirements to remove fragments, outliers, and noise. In some embodiments, the stripe-based segmentation approach described in the attached Appendix is used to segment redeye pixels. Referring to FIG. 25B, a redeye pixel correction region 228 that encompasses (or encircles) all pixels within the outer bounding region 224 classified as redeye pixels is identified (step 230). In some implementations, the redeye pixel correction region 228 has an elliptical shape. Pixels within the inner bounding region are classified by redness and skin tone coloration. In the illustrated example, the redeye pixel correction region 228 has a circular shape. In addition to the redeye pixel correction region 228, a redeye pixel smoothing region 232 surrounding the redeye pixel correction region 228 is computed. In the example illustrated in FIG. 25B, the redeye pixel smoothing region 232 is defined by a circular boundary 234 that is concentric with the redeye pixel correction region 228 and has a radius that is 50% larger than the radius of the redeye pixel correction region 228.

C. Re-Coloring Redeye Pixels

Referring back to FIG. 24, after the redeye pixels have been classified, the pixels in the mapped redeye pixel areas classified as redeye pixels are re-colored (step 236). Redeye pixels in the redeye pixel correction region 228 are corrected by desaturating and darkening the original color values as described in detail below. The original color values of redeye pixels in the redeye pixel smoothing region 232 are corrected in a similar way, except that the relative amount of correction varies from 90% at the boundary with the redeye pixel correction region 228 to 20% at the boundary 234 of the redeye pixel smoothing region 232. This smoothing or feathering process reduces the formation of disjoint edges in the vicinity of the corrected redeyes in the corrected image 20.

Initially, color correction darkening factors and weights are computed for the redeye pixels to be corrected. The darkening factors and weights indicate how strongly original color values of redeye pixels are to be desaturated (i.e., pushed towards neutral or gray values). As explained in detail below, these two factors vary with pixel location relative to the center of the redeye pixel correction region 228 to give a smooth transition between the pixels in the input image 12 that are changed and those that are not to avoid artifacts.

The darkening factors are computed based on luminance (or gray) values of the input image pixels. In one implementation, the darkening factors are computed based on the graph shown in FIG. 26, where the luminance (or gray) level of each redeye pixel is assumed to vary over a range of $[\text{lum}_{min}, \text{lum}_{max}]=[0, 1]$. In one implementation, the green color channel is used to estimate luminance values. Other implementations may use different estimates or measures of luminance values. In the illustrated implementation, the minimum darkening factor ($m_i$) is set to 0.6 and the maximum darkening factor ($m_f$) is set to 1.0. These parameters may be set to different values in other implementations. In this formulation, the darkening factor values decrease with the darkness levels of the pixels. That is, lower (i.e., darker) luminance (or gray) values are associated with lower darkness factors. Since the darkness factors influence pixel values in a multiplicative way in the implementation described below, darker pixels (i.e., pixels with lower luminance values) identified as redeye pixels are darkened more than lighter pixels (i.e., pixels with higher luminance values).

The weights (wt) are set for a given redeye pixel based on the number of redeye pixels that neighbor the given pixel. For example, in one implementation, the weights may be set as follows:

$$wt = \begin{cases} 0 & \text{redeye neighbors} = 0 \\ .33 & \text{redeye neighbors} = 1, 2, 3 \\ .67 & \text{redeye neighbors} = 4, 5, 6 \\ 1 & \text{redeye neighbors} = 7, 8 \end{cases} \quad (21)$$

where redeye neighbors corresponds to the number of redeye pixels that neighbor the given pixel being assigned a weighting factor. In this formulation, redeye pixels near the center of the redeye pixel correction region 228 are assigned higher weights than redeye pixels near the boundaries of the redeye pixel correction region 228.

Color values of redeye pixels are corrected by desaturating and darkening original color values in accordance with the computed darkening and weight factors. In some RGB color space implementations, the color values (red, green, blue) of each input image pixel identified as a redeye pixel are corrected to the final color values $(R_1, G_1, B_1)$ as follows:

---

If (mask = 1), tmp = dark[green − $\text{grn}_{min}$]
Else tmp = 1
    $R_1$ = (wt * tmp * green + (1 − wt) * red)
    $G_1$ = (wt * tmp * green + (1 − wt) * green)
    $B_1$ = (wt * tmp * green + (1 − wt) * blue)

---

In these embodiments, it is assumed that the color components of the input image pixels are defined with respect to the RGB color space. These embodiments readily may be extended to other color space representations. It is noted that if wt=1, pixel values are pushed all the way to neutral (i.e., the pixel values are set to the same shade of gray). If wt=0, none of the color component values of the corresponding pixel are changed. In this implementation, lower luminance pixels (i.e., smaller green values) generally are pushed darker than higher luminance pixels, which have their luminance unchanged.

IV. Conclusion

Other embodiments are within the scope of the claims.

Appendix

This Appendix describes a method of segmenting foreground pixels from background pixels in a binary image (or pixel map) by scanning the binary map in stripes of one or more pixel lines and tracking objects containing foreground pixels connected across stripes. In on implementation of this approach, foreground pixels are assigned a value of "1" and background pixels are assigned a value of "0". The foreground pixels are segmented into objects by labeling the foreground pixels such that all of the connected pixels have the same label, and each label is used to represent one object.

Experiments have shown that the following method is three to five times faster than a typical stack-based segmentation approach. In addition, in some implementations, this method is scalable in terms of speed and memory requirements.

I. Definitions and Data Structures

The strip-based segmentation method is described with reference to the follows terms and data structures.

Stripe

Figure 27:
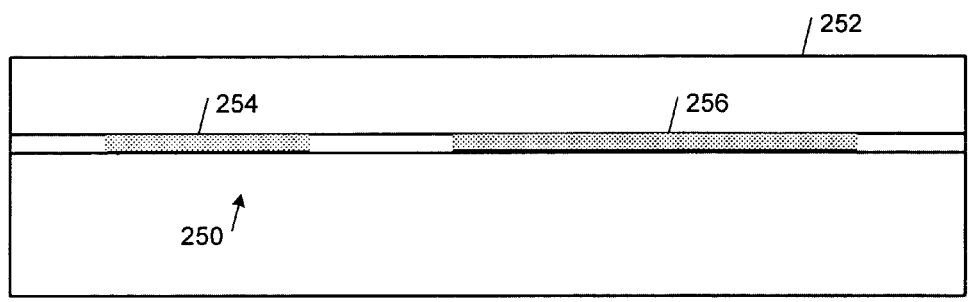
FIG. 27 shows a scanline superimposed over a binary image and containing stripes identified in an embodiment of a stripe-based method of segmenting pixels.

A stripe is defined as a consecutive horizontal run of foreground pixels. FIG. 27 illustrates a raster scan line 250 across an image 252 and two stripes 254, 256 on the scan line 150. The image 152 is converted into a group of stripes in accordance with a raster scan representation. In one implementation, a stripe is represented by the location of its first pixel on the left (row, col), and its run length (length). A pseudo code definition of a STRIPE structure in this implementation is as follows.

```
STRIPE {
    row, col
    length
    object_pointer
    next_stripe_pointer
}
```

In this definition, the object_pointer data field point to the object to which the corresponding stripe belongs, and the next_stripe_pointer field links multiple stripes into a linked list.

For a stripe object "S", a function O=OBJECT(S) is defined to return the object_pointer field of S. That is, object O is the object to which stripe S belongs.

Object

An OBJECT is a logic data structure that represents an object defined in image analysis. An object has the following attributes: a containing rectangle, its total size, and a pointer that links to stripes that belong to the object. A pseudo code definition of an OBJECT structure is as follows.

```
OBJECT {
    rect
    size
    stripe_pointer
    next_object_pointer
}
```

The stripe_pointer field points to the header of a linked list of STRIPE objects, which belong to this object, and the next_object_pointer field links multiple objects into a linked list.

For two objects O1 and O2, a merge function is defined as:

O=MERGE_OBJECT(O1, O2)

The MERGE_OBJECT function merges two objects O1, O2 into one object O. The resulting object O has the combined size and a containing rectangle encompassing the containing rectangles of O1 and O2. In addition, the stripes belonging to O1 and O2 are merged into one linked list in O.

Container

A CONTAINER is a linked list of OBJECT data structures. For a container C, an ADD(C,O) operation adds an OBJECT O to container C, and a DELETE(C,O) operation deletes an OBJECT O from container C.

II. Stripe-Based Segmentation

Figure 28:
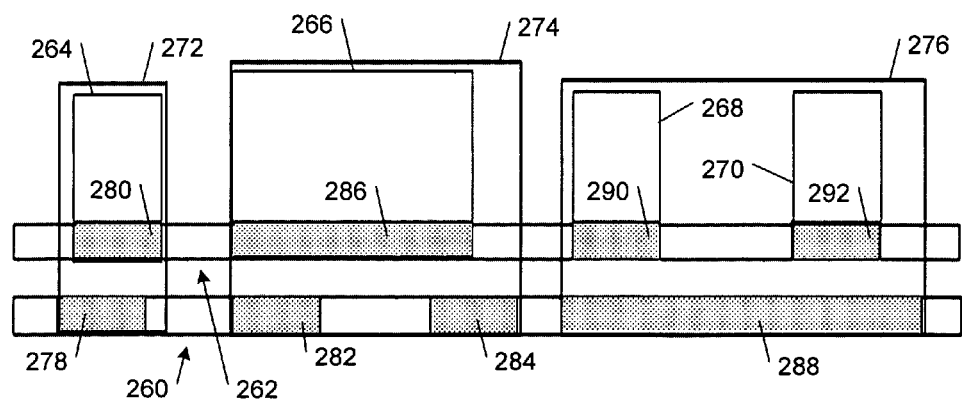
FIG. 28 shows containing rectangles for objects generated in an embodiment of a stripe-based method of segmenting pixels.

In this approach, an image is scanned line-by-line. At each scan line, a number of stripes are defined, and their connectivity with stripes on the adjacent previously-scanned line is analyzed. If a given stripe is connected with any stripe on the adjacent previously-scanned line, the object associated with the given stripe is extended to the current scan line. FIG. 28 shows exemplary an exemplary current scan line 260 and an adjacent previously-scanned scan line 162. In FIG. 28, boxes 264, 266, 268, 270 represent previously-defined containing rectangles of objects, and boxes 272, 274, 276 represent new containing rectangles that are defined to represent objects that extend across the scan lines 260, 262. FIG. 28 shows how the objects with containing boxes 272-276 are extended in three different cases. In particular, in box 272, one stripe 278 on the current scan line 160 connects with one stripe 280 on the previous line. In box 274, two stripes 282, 284 on the current scan line 260 connect with one stripe 186 on the adjacent previously-scanned line 162. In box 176, one stripe 288 on the current scan line 160 connects with two stripes 290, 292 on the adjacent previously-scanned line 262.

In this approach, the size and containing rectangle of each object are determined in a one-pass scan of the image. A second pass is used to label each pixel.

The following pseudo code describes one implementation of the stripe-based segmentation method. In this description, the input is a binary image and the output is a container "C", which contains all the generated objects.

A. Pseudo code for the main processing loop:

```
raster scan the input image line by line {
    define stripes in the current line;
    process the current line (see 2.2.II for details);
}
```

B. Pseudo code for the line processing loop:

```
for each stripe S in the current line {
    if it is connected to only one stripe S1 in the above line {
        link stripe A to the object OBJECT(S1) (the stripe S1 belongs to)
        update the containing rectangle (rect) and object size (size) of the object
    }
    else if it is connected to multiple stripes (S1, S2, . . ., Sn) in the above line {
        O = MERGE_OBJECTS(OBJECT(S1), OBJECT (S2), . . .,
```

```
        OBJECT (Sn))
    link stripe A to O
    update the containing rectangle (rect) and object size (size) of O
    DELETE(C, OBJECT(S1))
    DELETE(C, OBJECT(S2))
    ...
    DELETE(C, OBJECT(Sn))
    ADD(C, O)
    }
    else {
        allocate a new object O
        link stripe A to O
    update the containing rectangle (rect) and object size (size) of O
        ADD(C,O)
    }
}
```

What is claimed is:

1. A method of processing an input image, comprising:
sub-sampling the input image to generate a thumbnail image comprising a reduced-size version of the input image in its entirety;
detecting redeye pixel areas in the thumbnail image, wherein detecting redeye pixel areas comprises determining measures of pixel redness in the thumbnail image, and identifying a first set of candidate redeye pixel areas based on the determined pixel redness measures;
correcting redeye in a version of the input image based on the redeye pixel areas detected in the thumbnail image to produce a corrected version of the input image; and
producing an output image from the corrected version of the input image.

2. The method of claim 1, wherein pixel redness measures are determined based on a ratio of a measure of a red component of pixel energy to a measure of total pixel energy.

3. The method of claim 1, wherein identifying the first set of candidate redeye pixel areas comprises applying a two-dimensional redness filter to the determined pixel redness measures, wherein the redness filter is operable to determine for each region of the thumbnail image a respective redness score based on a comparison of an average of ones of the pixel redness measures in a central kernel pixel area of the thumbnail image and an average of the pixel redness measures in a pixel area of the thumbnail image surrounding the kernel pixel area.

4. The method of claim 3, further comprising applying a prescribed threshold to the determined redness scores to identify candidate redeye pixels.

5. The method of claim 4, wherein detecting redeye pixel areas further
comprises segmenting redeye pixels by scanning a redness map of the redness measures in stripes of one or more pixel lines and tracking objects containing candidate redeye pixels connected across stripes.

6. The method of claim 3, wherein detecting redeye pixel areas further comprises filtering from the first set each candidate redeye pixel area having a determined redness contrast relative to at least one respective neighboring pixel area less than a prescribed redness contrast threshold.

7. The method of claim 6, wherein each candidate redeye pixel area having a determined redness contrast relative to each of a set of corresponding surrounding pixel areas less than the prescribed redness contrast threshold is filtered from the first set.

8. A method of processing an input image, comprising:
sub-sampling the input image to generate a thumbnail image;
detecting redeye pixel areas in the thumbnail image, wherein detecting redeye pixel areas comprises determining measures of pixel redness in the thumbnail image, and identifying a first set of candidate redeye pixel areas based on the determined pixel redness measures, wherein identifying the first set of candidate redeye pixel areas comprises enlarging a given candidate redeye pixel area having a dimension below a threshold size to generate an enlarged pixel area;
correcting redeye in a version of the input image based on the redeye pixel areas detected in the thumbnail image to produce a corrected version of the input image; and
producing an output image from the corrected version of the input image.

9. The method of claim 8, wherein identifying the first set of candidate redeye pixel areas comprises comparing the enlarged pixel area to multiple pixel areas surrounding the enlarged pixel area, and selecting a pixel area to replace the given candidate redeye pixel area from among the enlarged pixel area and the surrounding pixel areas based on measures of redness determined for each of the enlarged pixel area and the surrounding pixel areas.

10. The method of claim 1, wherein detecting redeye pixel areas further comprises filtering from the first set each candidate redeye pixel area located in an area of the digital image having a determined grayscale contrast relative to at least one respective neighboring pixel area less than a prescribed grayscale contrast threshold.

11. The method of claim 10, further comprising:
determining measures of pixel grayscale in the digital image;
determining, for a given candidate redeye pixel area, a candidate iris area centered at the given candidate redeye pixel area and having a size maximizing grayscale contrast between the candidate iris area and areas surrounding the candidate iris area;
determining a measure of grayscale contrast between the candidate iris area and at least a portion of the areas surrounding the candidate iris area;
and applying a threshold to the determined grayscale contrast measure to filter candidate redeye pixel areas from the first set.

12. The method of claim 1, further comprising:
identifying a pixel boundary of a pixel region surrounding a given candidate redeye pixel area;
classifying pixels within the pixel boundary as red pixels and non-red pixels by applying a threshold to the determined pixel redness measures; and
filtering the given candidate redeye pixel area from the first set when a set of contiguous red pixels extends from the given candidate redeye pixel area to the pixel boundary.

13. The method of claim 12, further comprising identifying the set of
contiguous pixels by scanning a redness map of the redness measures in stripes of one or more pixel lines and tracking objects containing red pixels connected across stripes.

14. The method of claim 1, further comprising filtering candidate redeye pixel areas from the first set based on proportions of detected skin tone pixels in regions respectively surrounding the candidate redeye pixels areas.

15. The method of claim 1, further comprising pairing candidate redeye pixel areas in the first set, and filtering unpaired candidate redeye pixels areas from the first set.

16. The method of claim 15, wherein pairing candidate redeye pixel areas comprises comparing a candidate texture pattern determined for a candidate pair of candidate redeye pixel areas in the first set with a reference texture pattern.

17. The method of claim 1, further comprising detecting redeye pixel areas in the input image, and generating a set of detected redeye pixel areas by merging redeye pixel areas detected in the input image with redeye pixel areas detected in the thumbnail image.

18. The method of claim 1, wherein the correcting redeye comprises mapping the detected redeye pixel areas to the version of the input image.

19. The method of claim 18, wherein the correcting redeye comprises enlarging redeye pixel areas mapped to the version of the input image.

20. The method of claim 19, wherein the mapped redeye pixel areas are enlarged by amounts decreasing inversely with respect to original sizes of the mapped redeye pixel areas.

21. The method of claim 19, further comprising cropping corners from each of the enlarged redeye pixel areas.

22. The method of claim 19, wherein the correcting comprises classifying pixels in each of the mapped redeye pixel areas based on a redness threshold.

23. The method of claim 19, wherein the pixels in each of the mapped redeye pixel areas are classified on a pixel-by-pixel basis.

24. The method of claim 19, wherein each pixel in the mapped redeye pixel areas is classified with reference to an adjacent, previously-classified pixel.

25. The method of claim 19, wherein the correcting comprises correcting original color values of pixels in the mapped redeye pixel areas based on integer arithmetic computations.

26. The method of claim 18, further comprising classifying pixels as redeye pixels for correction before mapping detected redeye pixel areas to the version of the input image.

27. The method of claim 1, further comprising correcting redeye in the thumbnail image based on redeye pixel areas detected in the thumbnail image.

28. The method of claim 27, further comprising displaying the thumbnail image it corrected redeye, and correcting redeye in the input image based on redeye pixel areas detected in the thumbnail image in respond to a user command.

29. A method of processing an input image, comprising:
sub-sampling the input image to generate a thumbnail image;
detecting redeye pixel areas in the thumbnail image, wherein detecting redeye pixel areas comprises
determining measures of pixel redness in the thumbnail image,
identifying a first set of candidate redeye pixel areas based on the determined pixel redness measures,
pairing candidate redeye pixel areas in the first set, wherein pairing
candidate redeye pixel areas comprises comparing a candidate texture pattern determined for a candidate pair of candidate redeye pixel areas in the first set with a reference texture pattern,
wherein comparing the candidate texture pattern with the reference texture pattern comprises generating a feature vector representative of the candidate texture pattern and comparing the generated feature vector with a statistical model of the reference texture pattern, and
filtering unpaired candidate redeye pixels areas from the first set;
correcting redeye in a version of the input image based on the redeye pixel areas detected in the thumbnail image to produce a corrected version of the input image; and
producing an output image from the connected version of the input image.

30. The method of claim 29, wherein generating the feature vector representative of the candidate texture pattern comprises mapping a candidate redeye pair region encompassing the candidate redeye pail to a standardized candidate redeye pair template.

31. The method of claim 30, wherein mapping the candidate redeye pair region comprises cropping a pixel region from a grayscale map of the thumbnail image, rotating the cropped pixel region, and scaling the rotated pixel region.

32. The method of claim 31, wherein mapping the candidate redeye pair region comprises normalizing and equalizing the scaled pixel region.

33. The method of claim 30, wherein generating the feature vector representative of the candidate texture pattern comprises converting the mapped candidate redeye pair region to the feature vector.

34. A method of processing an input image, comprising:
sub-sampling the input image to generate a thumbnail image;
detecting redeye pixel areas in the thumbnail image;
correcting redeye in a version of the input image based on redeye pixel areas detected in the thumbnail image to produce a corrected version of the input image, wherein correcting redeye comprises identifying discrete redeye pixel areas separated from eyelid regions; and
producing an output image from the corrected version of the input image.

35. The method of claim 34, wherein identifying discrete redeye pixel areas comprises comparing at least one redeye pixel area size dimension to a threshold.

36. The method of claim 35, wherein a discrete redeye pixel area is identified based at least in part on a prescribed fraction of a respective grayscale iris area centered at a corresponding pixel area and having a size maximizing grayscale contrast between the grayscale iris area and areas surrounding the grayscale iris area.

37. The method of claim 34, wherein correcting redeye comprises classifying pixels in each non-discrete redeye pixel area based on skin tone coloration.

38. A method of processing an input image, comprising:
sub-sampling the input image to generate a thumbnail image;
detecting redeye pixel areas in the thumbnail image;
correcting redeye in a version of the input image based on redeye pixel areas detected in the thumbnail image to produce a corrected version of the input image, wherein correcting redeye comprises classifying pixels between concentric inner and outer bounding regions based on a grayscale threshold; and
producing an output image from the corrected version of the input image.

39. The method of claim 38, further comprising correcting original color values of pixels in a redeye pixel correction region encompassing pixels classified as redeye pixels.

40. The method of claim 39, wherein original color values of pixels in the redeye pixel correction region are corrected by desaturating original color values.

41. The method of claim 40, wherein the desaturating comprises desaturating original color values by respective amounts varying with pixel location in the final pixel mask.

42. The method of claim 40, wherein the correcting comprises darkening original color values of pixels in the redeye pixel correction region.

43. The method of claim 39, further comprising correcting original color values of pixels in a smoothing region surrounding the redeye pixel correction region.

44. The method of claim 43, wherein the correcting comprises correcting original color values of pixels in the smoothing region by an amount decreasing with distance from the given redeye pixel correction region.

45. The method of claim 44, wherein the correcting comprises correcting original color values of pixels in the redeye pixel correction region without reference to position within the redeye pixel correction region.

46. The method of claim 38, further comprising determining a size of the inner bounding region between a given redeye pixel area size and a corresponding grayscale iris area size, and determining a size of the outer bounding region larger than the determined size of the inner bounding region by a predetermined relative amount.

47. A method of processing an input image having lines of pixels with original color values, comprising:
　detecting one or more redeye pixel areas corresponding to respective areas in the input image;
　in a version of the input image, classifying each pixel corresponding to the detected redeye pixel areas as a redeye pixel or a non-redeye pixel on a line-by-line basis without reference to pixels in adjacent lines;
　correcting the original color values of pixels classified as redeye pixels in the version of the input image to produce a corrected version of the input image; and
　producing an output image from tire corrected version of the input image.

48. The method of claim 47, wherein a pixel in a given line is classified with reference to an adjacent, previously-classified pixel in the given line.

49. The method of claim 47, wherein correcting redeye comprises identifying discrete redeye pixel areas separated from eyelid regions.

50. The method of claim 49, wherein identifying discrete redeye pixel areas comprises comparing at least one redeye pixel area size dimension to a threshold.

51. The method of claim 50, wherein a discrete redeye pixel area is identified based at least in part on a prescribed fraction of a respective grayscale iris area centered at a corresponding pixel area and having a size maximizing grayscale contrast between the grayscale iris area and areas surrounding the grayscale iris area.

52. The method of claim 49, wherein correcting redeye comprises classifying pixels in each non-discrete redeye pixel area based on skin tone coloration.

53. The method of claim 47, wherein correcting redeye comprises classifying pixels in each redeye pixel area based on a redness threshold.

54. The method of claim 47, further comprising correcting original color values of pixels classified as redeye pixels by desaturating original color values.

55. The method of claim 47, further comprising correcting original color values of pixels classified as redeye pixels by darkening the original color values.

56. A system for processing an input image, comprising computing hardware operable to perform operations comprising:
　sub-sampling the input image to generate a thumbnail image comprising reduced-size versions of all regions of the input image;
　detecting redeye pixel areas in the thumbnail image, wherein in the detecting the computing hardware is operable to perform operations comprising determining measures of pixel redness in the thumbnail image, and identifying a first set of candidate redeye pixel areas based on the determined pixel redness measures;
　correcting redeye in a version of the input image based on the redeye pixel areas detected in the thumbnail image to produce a corrected version of the input image.

57. The system of claim 56, wherein the computing hardware is operable to perform operations comprising applying a two-dimensional redness filter to the determined pixel redness measures, wherein the redness filter is operable to determine a redness score based on a central kernel pixel area and a pixel area surrounding the kernel pixel area.

58. The system of claim 56, wherein the computing hardware operable to perform operations comprising filtering candidate redeye pixel areas from the first set based on proportions of detected skin tone pixels in regions respectively surrounding the candidate redeye pixels areas.

59. The system of claim 56, wherein the computing hardware operable to perform operations comprising pairing candidate redeye pixel areas in the first set and filters unpaired candidate redeye pixels areas from the first set.

60. The system of claim 56, wherein the computing hardware operable to perform operations comprising detecting redeye pixel areas in the input image and generates a set of detected redeye pixel areas by merging redeye pixel areas detected in the input image with redeye pixel areas detected in the thumbnail image.

61. A system for processing an input image, comprising computing hardware operable to perform operations comprising
　sub-sampling the input image to generate a thumbnail image;
　detecting redeye pixel areas in the thumbnail image, wherein in the detecting the computing hardware is operable to perform operations comprising determining measures of pixel redness in the thumbnail image, identifying a first set of candidate redeye pixel areas based on the determined pixel redness measures, and enlarging a given candidate redeye pixel area having a dimension below a threshold size to generate an enlarged pixel area; and
　correcting redeye in a version of the input image based on the redeye pixel areas detected in the thumbnail image to produce a corrected version of the input image.

62. A system for processing an input image, comprising computing hardware operable to perform operations comprising:
　sub-sampling the input image to generate a thumbnail image;
　detecting redeye pixel areas in the thumbnail image, wherein in the detecting the computing hardware is operable to perform operations comprising determining measures of pixel redness in the thumbnail image, identifying a first set of candidate redeye pixel areas based on the determined pixel redness measures, and filtering from the first set each candidate redeye pixel area located in an area of the digital image having a determined grayscale contrast relative to at least one respective neighboring pixel area less than a prescribed grayscale contrast threshold;
　correcting redeye in a version of the input image based on the redeye pixel areas detected in the thumbnail image to produce a corrected version of the input image.

63. A system for processing an input image, comprising computing hardware operable to perform operations comprising:
　sub-sampling the input image to generate a thumbnail image;

detecting redeye pixel areas in the thumbnail image, wherein in the detecting the computing hardware is operable to perform operations comprising determining measures of pixel redness in the thumbnail image, identifying a first set of candidate redeye pixel areas based on the determined pixel redness measures, identifying a pixel boundary of a pixel region surrounding a given candidate redeye pixel area;

classifying pixels within the pixel boundary as red pixels and non-red pixels by applying a threshold to the determined pixel redness measures, and filtering the given candidate redeye pixel area from the first set when a set of contiguous red pixels extends from the given candidate redeye pixel area to the pixel boundary; and correcting redeye in a version of the input image based on the redeye pixel areas detected in the thumbnail image to produce a corrected version of the input image.

64. A system for processing an input image having lines of pixels with original color values, comprising computing hardware operable to perform operations comprising:

detecting one or more redeye pixel areas corresponding to respective areas in the input image;

classifying each pixel in the input image corresponding to the detected redeye pixel areas as a redeye pixel or a non-redeye pixel on a line-by-line basis without reference to pixels in adjacent lines; and correcting the original color values of pixels in the input image classified as redeye pixels to produce a corrected version of the input image.

* * * * *

UNITED STATES PATENT AND TRADEMARK OFFICE
CERTIFICATE OF CORRECTION

PATENT NO. : 7,454,040 B2  Page 1 of 1
APPLICATION NO. : 10/653021
DATED : November 18, 2008
INVENTOR(S) : Huitao Luo et al.

It is certified that error appears in the above-identified patent and that said Letters Patent is hereby corrected as shown below:

In column 20, line 7, delete "02)" and insert -- O2) --, therefor.

In column 23, line 40, in Claim 28, delete "it" and insert -- with --, therefor.

In column 24, line 1, in Claim 29, delete "connected" and insert -- corrected --, therefor.

In column 24, line 6, in Claim 30, delete "pail" and insert -- pair --, therefor.

In column 25, line 29, in Claim 47, delete "tire" and insert -- the --, therefor.

In column 26, lines 28-29, in Claim 61, delete "comprising" and insert -- comprising: --, therefor.

In column 27, line 9, in Claim 63, delete "area;" and insert -- area, --, therefor.

Signed and Sealed this

Seventh Day of April, 2009

JOHN DOLL
*Acting Director of the United States Patent and Trademark Office*